(12) United States Patent  (10) Patent No.: US 9,110,464 B2
Holland et al.  (45) Date of Patent: Aug. 18, 2015

(54) ROUTE BUILDER

(71) Applicant: INTELLIGRATED HEADQUARTERS LLC, Mason, OH (US)

(72) Inventors: Mark C. Holland, Maineville, OH (US); Joshua P. Hays, Mason, OH (US)

(73) Assignee: INTELLIGRATED HEADQUARTERS LLC, Mason, OH (US)

(*) Notice: Subject to any disclaimer, the term of this patent is extended or adjusted under 35 U.S.C. 154(b) by 83 days.

(21) Appl. No.: 14/086,170

(22) Filed: Nov. 21, 2013

(65) Prior Publication Data

US 2015/0142168 A1 May 21, 2015

(51) Int. Cl.
*G06F 7/00* (2006.01)
*G05B 19/418* (2006.01)

(52) U.S. Cl.
CPC ................ *G05B 19/41865* (2013.01)

(58) Field of Classification Search
None
See application file for complete search history.

(56) References Cited

U.S. PATENT DOCUMENTS

2004/0143560 A1* 7/2004 Zhu ............................ 706/19
2009/0132079 A1 5/2009 Franco
2012/0029689 A1 2/2012 Baier et al.

FOREIGN PATENT DOCUMENTS

JP 04-163666 A 6/1992
JP 04-340607 A 11/1992

OTHER PUBLICATIONS

International Search Report from the Korean Intellectual Property Patent Office in International Application No. PCT/US2014/066669 mailed Feb. 27, 2015.

* cited by examiner

*Primary Examiner* — Yolanda Cumbess
(74) *Attorney, Agent, or Firm* — The Marbury Law Group, PLLC

(57) ABSTRACT

Systems, methods, and devices of the various embodiments enable graph based routing of containers and adjustments of container routing based on one or more current material handling system state. The various embodiments enable examination and evaluation of the material handling systems using graphs to find an optimal route from a starting node in the material handling system to an ending node in the material handling system. In an embodiment, the graph may be a directed graph of edges and nodes of a material handling system. In an embodiment, the directed graph may include edge weights and the edge weights may be used to determine the optimal route for the container. In an embodiment, the edge weights may be updated as events occur in the material handling system which may result in dynamic routing of containers through the material handling system.

30 Claims, 21 Drawing Sheets

ROUTE BUILDER

BACKGROUND

Currently, the routing of a container holding inventory items through distribution center material handling systems is performed using static predetermined configuration data. Static configuration data for the distribution center material handling systems is created at some initial time, and this static configuration data is then used to make routing decisions that control how containers move through the distribution center material handling systems. Because the configuration data is static, the path from one place in the distribution center material handling system to another place in the distribution center material handling system is predefined. These predefined routes based on static configuration data are not necessarily optimized routes from one place to another. Moreover, these predefined routes cannot dynamically adjust for congestion in the material handling systems, and cannot dynamically adjust when a failure condition in a piece of material handling equipment in the material handling systems occurs.

SUMMARY

The systems, methods, devices, and non-transitory processor readable mediums of the various embodiments enable graph based routing of containers and dynamic adjustments of container routing based on one or more current material handling system states. The various embodiments enable examination and evaluation of the distribution center material handling systems using graphs to find an optimal route from a starting node in the distribution center material handling system to an ending node in the distribution center material handling system.

In an embodiment, the graph may be a directed (or directional) graph illustrating the edges and nodes of a material handling system in a distribution center. In an embodiment, the directional graph may include edge weights and the edge weights may be used to determine the optimal route for the container. In an embodiment, the edge weights may be updated as events occur in the distribution center material handling system which may result in dynamic routing of containers through the distribution center material handling system.

BRIEF DESCRIPTION OF THE DRAWINGS

The drawings and detailed description which follow are intended to be merely illustrative and are not intended to limit the scope of the invention as contemplated by the inventors.

DETAILED DESCRIPTION

Figure 1:
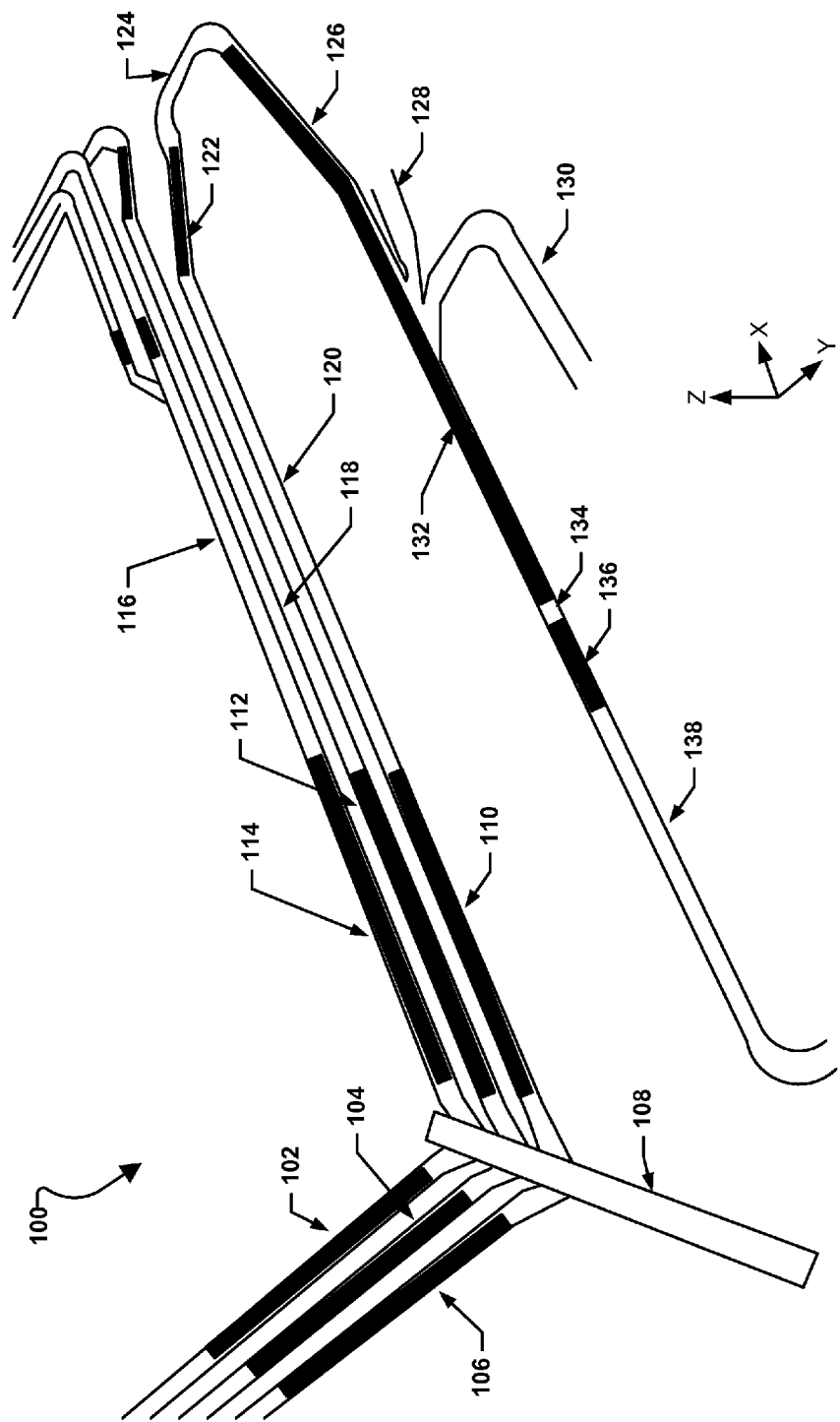
FIG. 1 is a three dimensional view of a physical model of a material handling system in a distribution center.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "piece of material handling equipment" is used to refer to a piece of motorized equipment that may be controlled to actively move containers within a material handling system. Examples, of pieces of material handling equipment include line conveyors, accumulation conveyors, motorized rollers, sorters, infinite merge conveyors, right angle transfers, vertical belt conveyors, etc.

As used herein, the term "material handling system" is used to refer to a group of pieces of material handling equipment which may be controlled to work in concert to move containers from one place in a distribution center to another place in a distribution center. The term "distribution center" is used generally herein as a term referring to any facility in which containers may be moved. Distribution centers may frequently also be referred to as warehouses, DCs, Regional DCs, and/or fulfillment centers.

As used herein, the term "container" is used to refer to any item which may be moved within a distribution center. Containers may include parts, goods, packages, bins, totes, and/or collections of parts, goods, packages, bins, totes.

As used herein, the term "computing device" is used to refer to any one or all of desktop computers, server computers, personal data assistants (PDA's), laptop computers, tablet computers, smart books, palm-top computers, and similar electronic devices which include a programmable processor and memory and circuitry configured to provide the functionality described herein.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as laptop computer, thereby enabling it to function as a server (e.g., an enterprise e-mail server) only to the extent necessary to provide the functionality described herein.

The systems, methods, devices, and non-transitory processor readable mediums of the various embodiments enable graph based routing of containers and adjustments of container routing based on one or more current material handling system states. The various embodiments enable examination and evaluation of the material handling systems using graphs to find an optimal route from a starting node in the material handling system to an ending node in the material handling system. In an embodiment, the graph may illustrate the edges and nodes of a material handling system operating within a distribution center. In an embodiment, the graph may include edge weights and the edge weights may be used to determine the optimal route for the container. In an embodiment, the edge weights may be updated as events occur in the material handling system which may result in dynamic routing of containers through the material handling system.

Route graphs according to the various embodiments may provide container routing systems or modules the ability to "look ahead" at the complete material handling system to determine the availability of each piece of material handling equipment included in the material handling system. The current graph of the material handling system may identify each piece of material handling equipment as an enabled or disabled node or edge. Enabled nodes or edges may be those pieces of material handling equipment currently operating and designated as capable of receiving containers. Disabled nodes or edges may be those pieces of material handling equipment currently out of operation or unavailable to receive containers. By avoiding disabled nodes and/or edges, containers may be routed to avoid those pieces of material handling equipment that are currently out of operation or unavailable.

Route graphs according to the various embodiments may provide a container routing system or module the ability to evaluate a route weight. Each edge in a current graph of the material handling system may be assigned an edge weight (or cost). An edge weight (or cost) may represent a value associated with the conveyor or other piece of material handling equipment represented by the edge, such as a conveyor speed, container congestion indication, container count, loading percentage, etc. The optimal route from a starting node in the material handling system to an ending node in the material handling system may be the route with the lowest weight (or cost), where the weight (or cost) of the route is the sum of the weights (or costs) of each edge in the route.

In an embodiment, the status of nodes and/or edges as enabled or disabled, as well as edge weights, may be updated based on indications of events occurring or occurred in the material handling system. Events may include: equipment status events indicating a node or edge is enabled or disabled; equipment status events indicating a percentage full event for a lane; and/or a divert confirmation event indicating containers are being diverted from a piece of material handling equipment. In this manner, as events occur the edge weights of the current graph may be updated, and subsequent packages may routed along other routes between the same starting and ending nodes in the material handling system.

In the various embodiments, shortest path or minimum spanning tree algorithms, such as Dijkstra's algorithm, may be used to evaluate the current graph of the material handling system and determine the optimal route for a container through the material handling system.

FIG. 1 is a three dimensional view of a physical model of a portion of a material handling system 100 operating within a distribution center. FIG. 1 illustrates various pieces of material handling equipment and their relationships in the x, y, and z directions. The material handling system 100 may include motorized rollers 102, 104, and 106, infinite merge conveyor 108, motorized rollers 110, 112, and 114, line conveyors 116, 118, and 120, motorized roller 122, conveyor 124, vertical belt conveyor 126, motorized rollers 128 and 130, motorized rollers 134, and 136, and conveyor 138. The pieces of material handling equipment 102, 104, 106, 108, 110, 112, 114, 116, 118, 120, 122, 124, 126, 128, 130, 134, 136, and 138 may be controlled by a computing device, such as a computing device of a material handling system configured with processor-executable instructions to perform operations to function as a conveyor control system or to execute a conveyor control module or application, to route containers from one area in the material handling system to another area in the material handling system.

Figure 2:
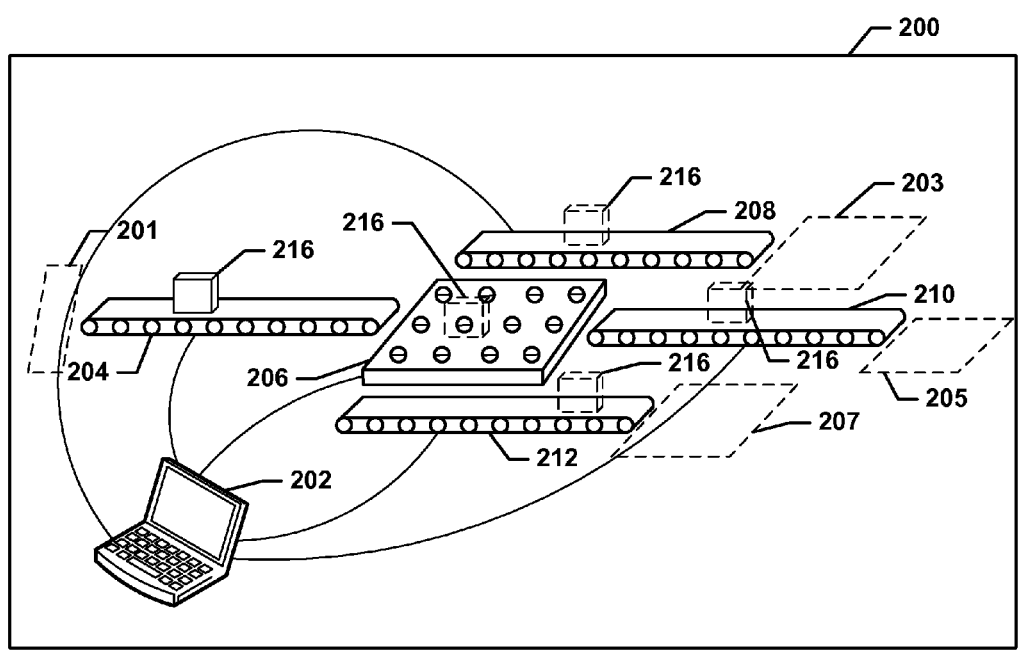
FIG. 2 is a block diagram of example elements of a material handling system in a distribution center suitable for use in the various embodiments.

FIG. 2 is a block diagram of example elements of a material handling system 200 operating within a distribution center suitable for use in the various embodiments. The material handling system 200 may include four conveyors 204, 208, 210, and 212 a right angle transfer 206. The conveyors 204, 208, 210, and 212 and right angle transfer 206 may connect areas in the material handling system 200, such as a pick zone 201, shipping door 203, shipping door 205, and shipping door 207, with each other. The operation of conveyors 204, 208, 210, and 212 and right angle transfer 206 may be controlled by one or more computing device 202, such as a computing device of a material handling system configured with processor-executable instructions to perform operations to function as a conveyor control system or to execute a conveyor control module or application, to move a container 216 from the pick zone 201 to the right angle transfer 206 and on to any of the shipping doors 203, 205, and 207.

In a graph of the material handling system 200 operating within the distribution center, the pick zone 201, shipping door 203, shipping door 205, shipping door 207, and right angle transfer 216 may be identified as nodes. The conveyors 204, 208, 210, and 212 may be identified in the graph of the material handling system 200 operating within the distribution center as edges connecting one node to another node. In an embodiment, the current state of the conveyors 204, 208, 210, and 212, right angle transfer 206, pick zone 201, shipping door 203, shipping door 205, and/or shipping door 207 may be indicated in the graph as enabled or disabled. Additionally, line edge weights for the conveyors 204, 208, 210, and 212 may be indicated in the graph. The line edge weights may be values associated with each conveyor 204, 208, 210, and 212. An edge weight may represent a relative importance/criticality value associated with the conveyor 204, 208, 210, and 212 based on one or more factors at a given time. These factors may include conveyor speed, a container congestion indication, a container count, a loading percentage (or percentage full), etc. In an embodiment, the computing device 202 may use the graph of the material handling system 200 to determine a route for the container 216 from a starting point node in the material handling system 200 to an ending node in the material handling system 200, and may control the conveyors 204, 208, 210, and 212 and right angle transfer 206 to move the container 216 along the determined route.

For example, the starting node for the container 216 may be indicated as the pick zone 201 and the ending node for the container 216 may be indicated as shipping door 203. The computing device 202 may use the graph to determine a route in which the container is designated to move from the pick zone 201 (the starting node) along the conveyor 204 (an intermediate edge) to the right angle transfer 206 (an intermediate node) and then from the right angle transfer 206 along the conveyor 208 (another intermediate edge) to the shipping zone 203 (the ending node).

Figure 3:
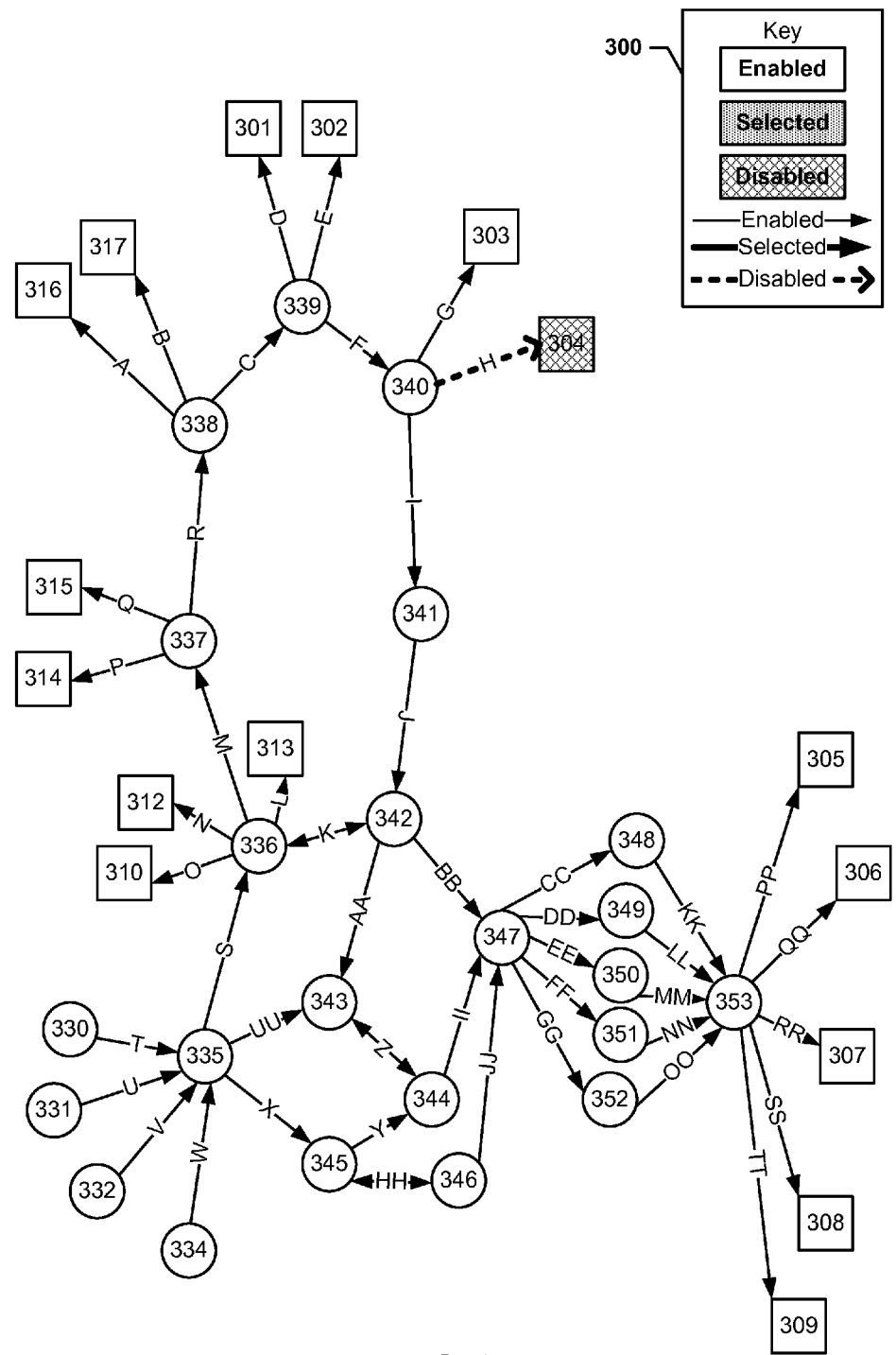
FIG. 3 is a graph of a material handling system in a first state according to an embodiment.

FIG. 3 is a graph of a material handling system in a first state according to an embodiment. In an embodiment, the graph may be stored in a memory available to a computing device, such as a computing device of a material handling system configured with processor-executable instructions to perform operations to function as a conveyor control system or to execute a conveyor control module or application, and/or displayed on display of the computing device. The graph may represent the areas within a distribution center and the individual pieces of material handling equipment comprising the material handling system. Nodes in the graph may include: a pick zone 301; a pick zone 302; a pick zone 303; a pick zone 304; a shipping door 305; a shipping door 306; a shipping door 307; a shipping door 308; a shipping door 309; a pick zone 310; a pick zone 312; a pick zone 313; a pick zone 314; a pick zone 315; a pick zone 316; a pick zone 317; a manual carton build station 330; an automatic carton build station 331; an automatic carton build station 332; an automatic carton build station 334; an order start sorter 335; a loop sorter 336; a transfer 337; a transfer 338; a transfer 339; a transfer 340; a reinduct 341; an outbound sorter 342; a loop sorter 343; an outbound sorter 344; a loop sorter 345; an outbound sorter 346; a consolidation sorter 347; a single unit scale 348; a single unit scale 349; an inline scale 350; an inline scale 351; a gift wrap scale 352; and a shipping sorter 353.

Edges in the graph may include the conveyors (or other types of material handling equipment) A, B, C, D, E, F, G, H, I, J, K, L, M, N, O, P, Q, R, S, T, U, V, W, X, Y, Z, AA, BB, CC, DD, EE, FF, GG, HH, II, JJ, KK, LL, MM, NN, OO, PP, QQ, RR, SS, TT, and UU. The edges may connect two nodes with each other such that a container may move along a given edge to transit from one node to another node. Additionally, a direction along which a container must travel along an edge may be indicated in the graph by an arrowhead indicating the direction of movement along that edge. In this manner, by indicating the direction or directions along which a container may travel along an edge the graph may be a directional (or directed) graph. As discussed further below, additional information about the various edges may be indicated in the graph, such as edge weights. While illustrated as single lines between nodes, edges may represent one or more conveyors (or other types of material handling equipment) working in concert to move a container between two nodes.

The graph may indicate the state of the nodes and edges as enabled, selected, and/or disabled as indicated by the key 300. In the first state the conveyor connecting the transfer 340 and the pick zone 304 may be broken and/or the pick zone 304 may be unmanned. This current state of the transfer 340 and pick zone 304 may be indicated in the graph by the edge H being indicated as disabled and the node for the pick zone 304 also being indicated as disabled.

Figure 4:
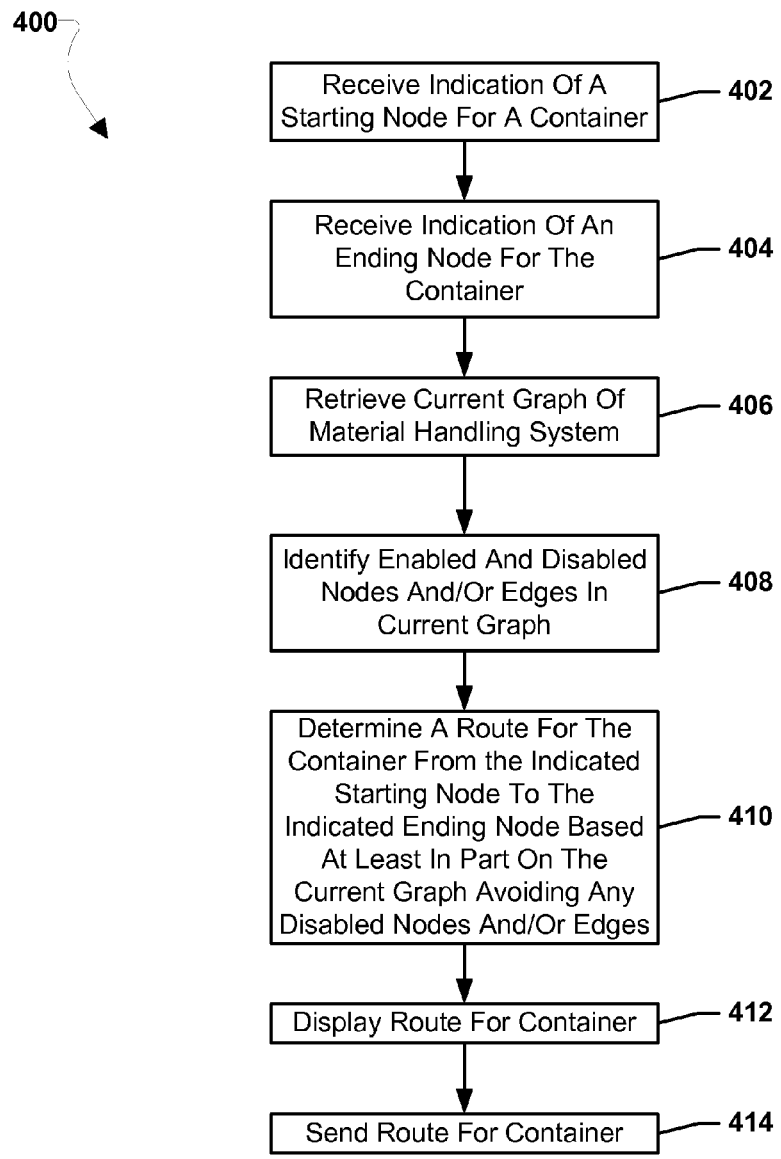
FIG. 4 is a process flow diagram illustrating an embodiment method for determining a route based on a current graph of a material handling system.

FIG. 4 illustrates an embodiment method 400 for determining a route based on a current graph of a material handling system. In an embodiment, the operations of method 400 may be performed by a processor of a computing device, such as a computing device of a material handling system running a container routing module or application. In block 402 the computing device may receive an indication of a starting node for a container. The starting node may be an initial node from which a route is to be generated. The indication of a starting node for a container may be an indication of a current location of a container within a material handling system entered by a user or may be a current location of a container provided by a piece of material handling equipment in the material handling system, such as a bar code scanner. In block 404 the computing device may receive an indication of the ending node for the container. The ending node may be the ultimate destination node at which a route is to terminate. The indication of an ending node for a container may be an indication of a desired location for the container in a material handling system (e.g., a shipping door) entered by a user or may be a preset location for the container within the material handling system based on an attribute associated with a container, such as type, intended customer, etc.

In block 406 the computing device may retrieve the current graph of the material handling system. In an embodiment, the computing device may retrieve the current graph from a memory available to the computing device, such as a local memory, remote database, etc. In block 408 the computing device may identify enabled and disabled nodes and/or edges in the current graphs. In block 410 the computing device may determine a route for the container from the indicated starting node to the indicated ending node based at least in part on the current graph and avoiding any identified disabled nodes and/or edges. In an embodiment, the computing device may apply shortest path or minimum spanning tree algorithms to evaluate the current graph and determine a route avoiding disabled nodes and/or edges. In this manner, the computing device may find a route for the container from the starting node to the ending node that routes the container around disabled edges and nodes within the material handling system.

In block 412 the computing device may display the route for the container. In an embodiment, the route may be displayed on the current graph. In an additional embodiment, the route may be displayed as an ordered list of nodes. In block 414 the computing device may send an indication of the determined route for the container. As an example, an indication of the determined route may be sent to a conveyor control system or module to control pieces of material handling system in the distribution center to move the container from the starting node to the ending node along the determined route.

Figure 5:
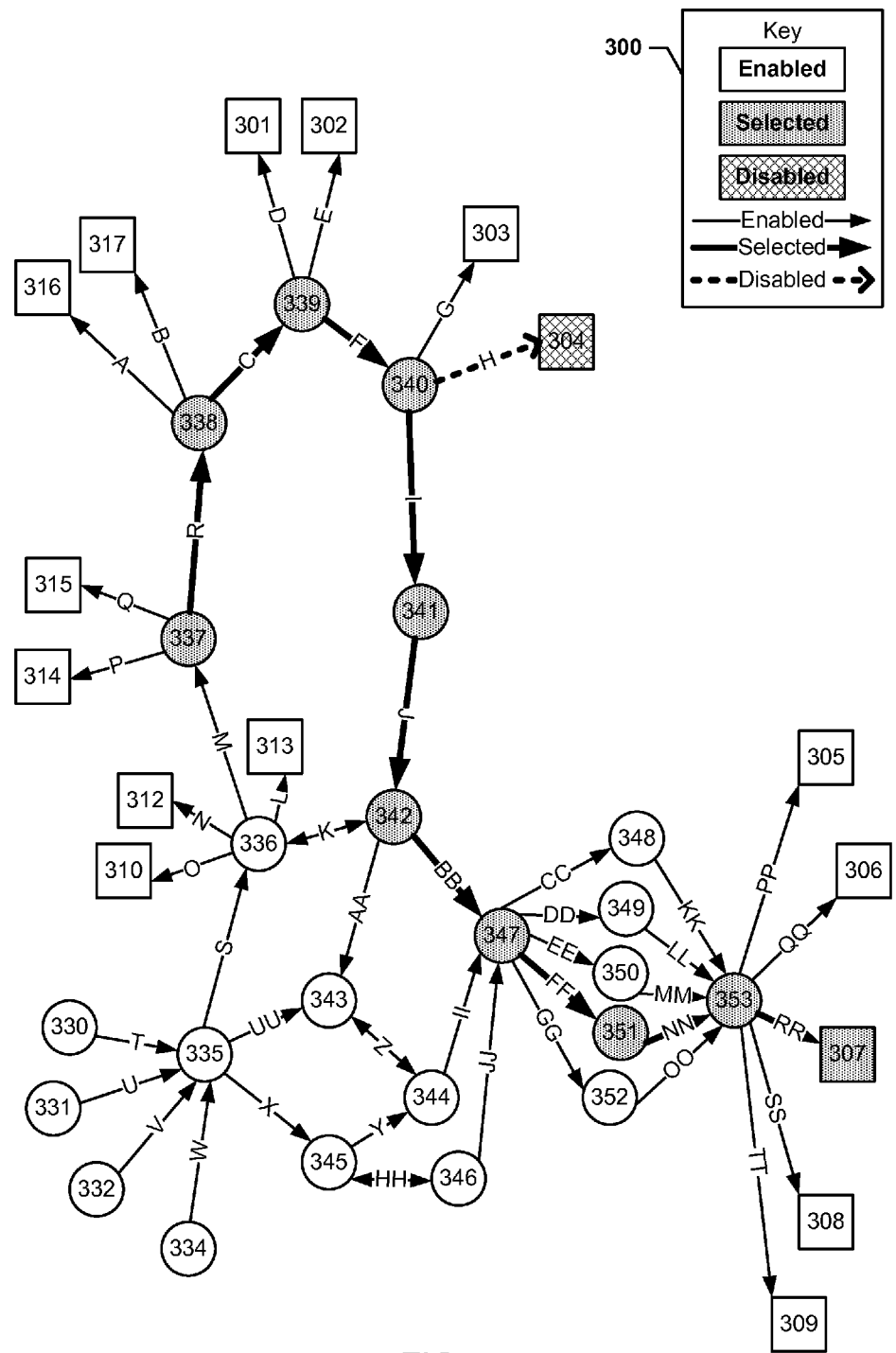
FIG. 5 is a graph of the material handling system in the first state illustrating a container route according to an embodiment.

FIG. 5 is a graph of the material handling system in the first state illustrated in FIG. 3 showing a container route determined according to the operations of method 400 described above. The starting node may have been indicated as the transfer 337 and the ending node as the shipping door 307. Avoiding the disabled edge H and disabled node for the pick zone 304, the computing device may have determined a route for the container from the transfer 337 to the transfer 338 via the edge R, from the transfer 338 to the transfer 339 via the edge C, from the transfer 339 to the transfer 340 via the edge F, from the transfer 340 to the reinduct 341 via the edge I, from the reinduct 341 to the outbound sorter 342 via the edge J, from the outbound sorter 342 to the consolidation sorter 347 via the edge BB, from the consolidation sorter 347 to the inline scale 351 via the edge FF, from the inline scale 351 to the shipping sorter 353 via the edge NN, and from the shipping sorter 353 to the shipping door 307 via the edge RR.

Figure 6:
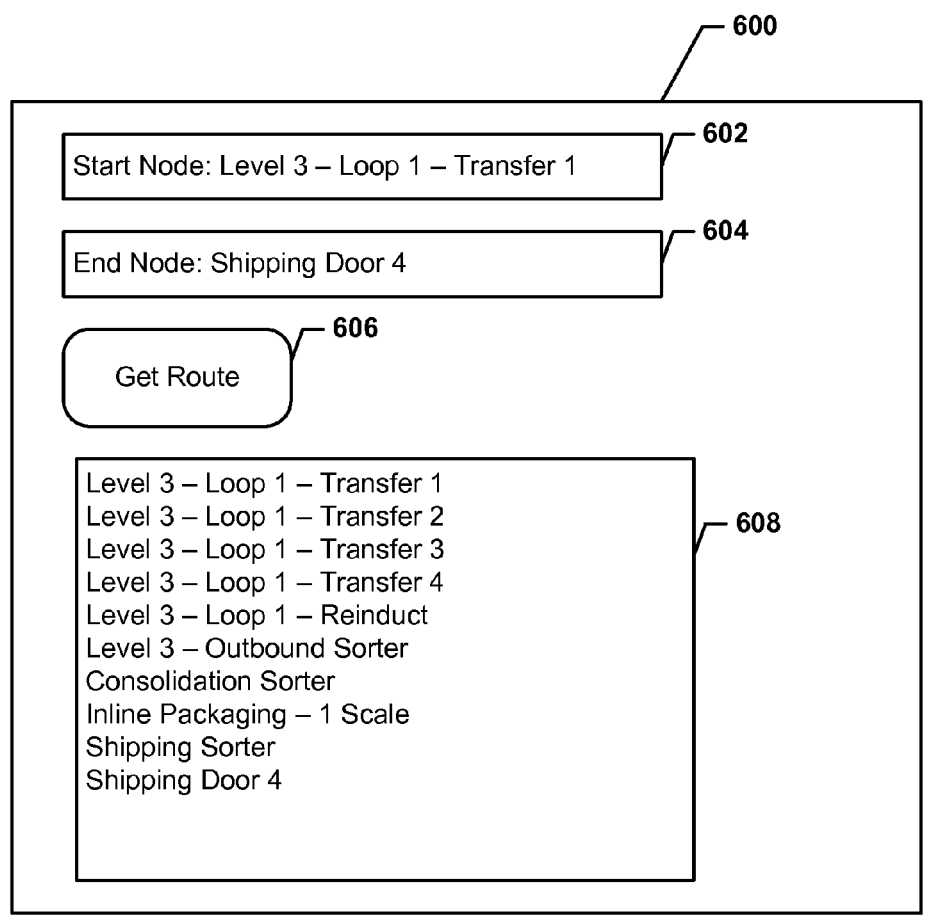
FIG. 6 is a block diagram of an example route generation graphical user interface element according to an embodiment.

FIG. 6 illustrates an example route generation graphical user interface element 600 showing the route determined based on the graph illustrated in FIG. 5 according to the operations of method 400 described above. The identifier for a starting node transfer 337 "Level 3-Loop 1-Transfer 1" may be entered in a start node field 602 and the identifier for an ending node shipping door 307 "Shipping Door 4" may be entered in an end node field 604. In an embodiment, a user may select a "Get Route" button 606 to generate a route based on the current state of the graph. The ordered listing of the identifiers of the various nodes through which the container will travel along the determined route from the starting node to the ending node may be displayed in the route field 608.

Figure 7:
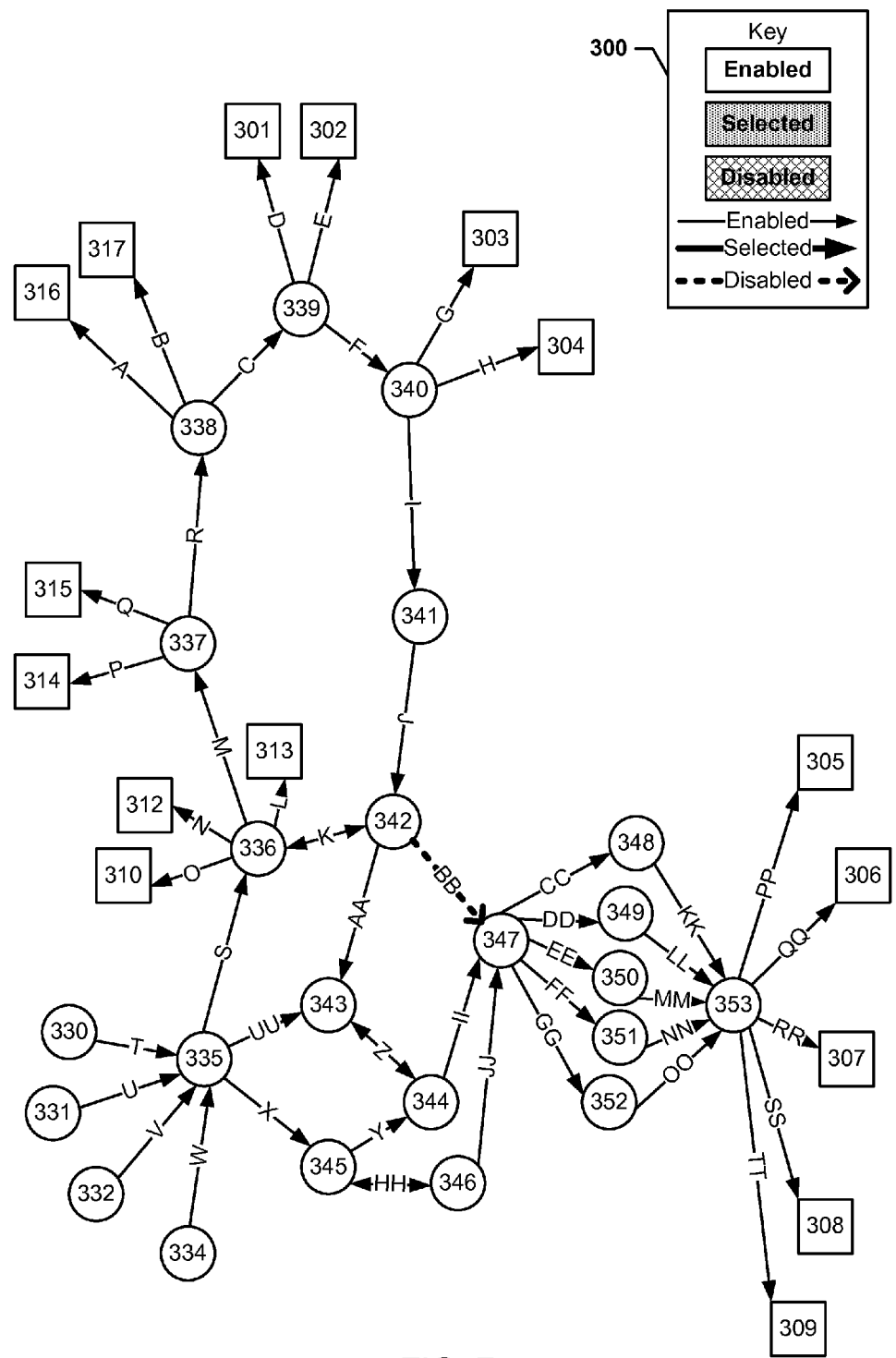
FIG. 7 is a graph of the material handling system in a second state according to an embodiment.

FIG. 7 is a graph of the material handling system illustrated in FIG. 3 in a second state, such as at a later time, in which the edge H and node 304 have been enabled, but the edge BB between outbound sorter 342 and consolidation sorter 347 has been disabled. The edge BB may be disabled because an equipment event received by the computing device may indicate the conveyor between the outbound sorter 342 and the consolidation sorter 347 may have stopped working due to an equipment failure or some type of jam.

Figure 8:
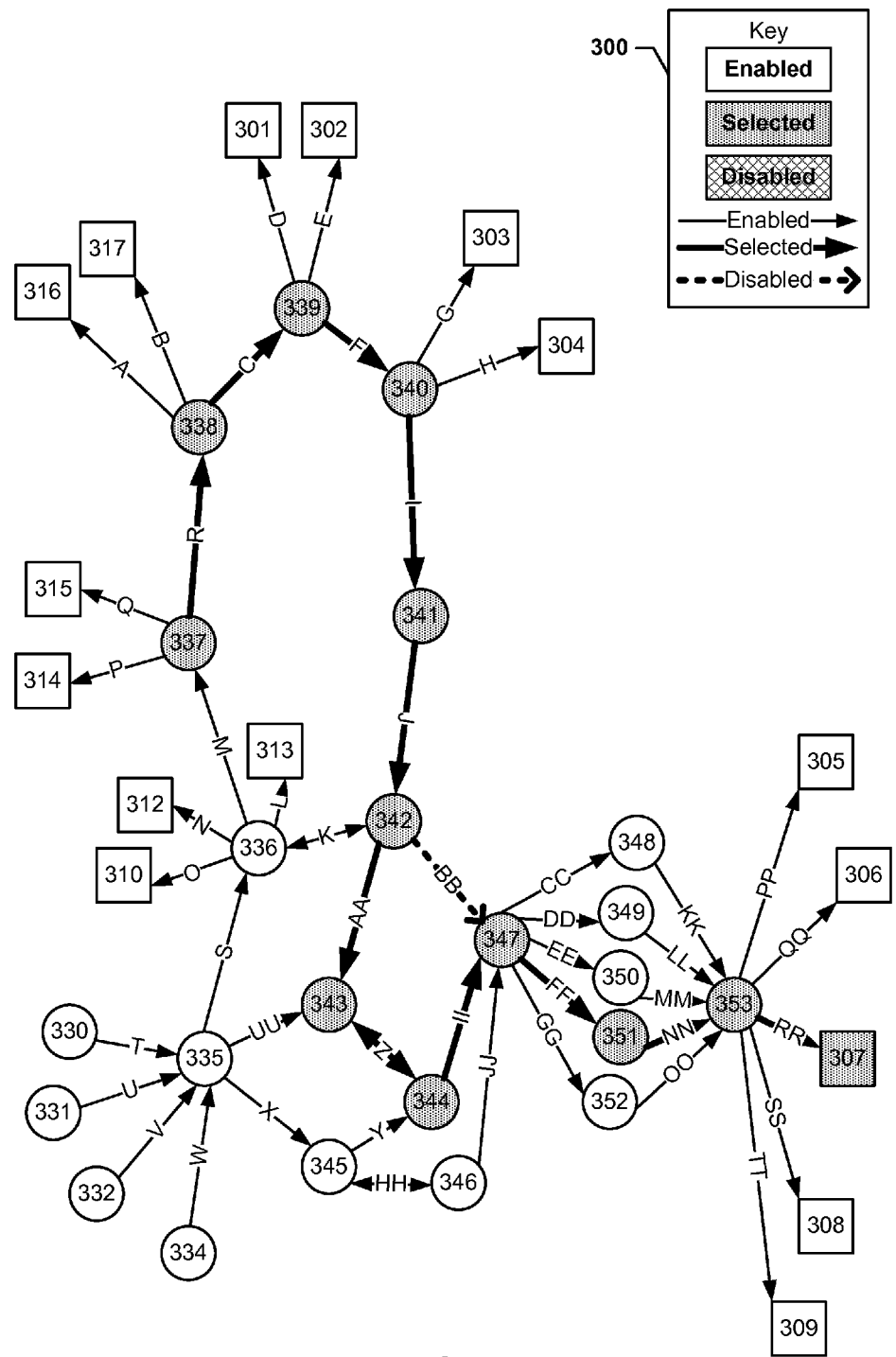
FIG. 8 is a graph of the material handling system in the second state illustrating a container route according to an embodiment.

FIG. 8 is a graph of the material handling system in the second state illustrated in FIG. 7 showing a container route determined according to the operations of method 400 described above. The starting node may have been indicated as the transfer 337 and the ending node as the shipping door 307, the same as discussed above with reference to FIG. 5. However, in the second state, because the edge BB is disabled the determined route from the transfer 337 to the shipping door 307 may be different in FIG. 8. Avoiding the disabled edge BB, the computing device may have determined an alternative route for the container from the transfer 337 to the transfer 338 via the edge R, from the transfer 338 to the transfer 339 via the edge C, from the transfer 339 to the transfer 340 via the edge F, from the transfer 340 to the reinduct 341 via the edge I, from the reinduct 341 to the outbound sorter 342 via the edge J, from the outbound sorter 342 to the loop sorter 343 via the edge AA, from the loop sorter 343 to the outbound sorter 344 via the edge Z, from the outbound sorter 344 to the consolidation sorter 347 via the edge II, from the consolidation sorter 347 to the inline scale 351 via the edge FF, from the inline scale 351 to the shipping sorter 353 via the edge NN, and from the shipping sorter 353 to the shipping door 307 via the edge RR.

Figure 9:
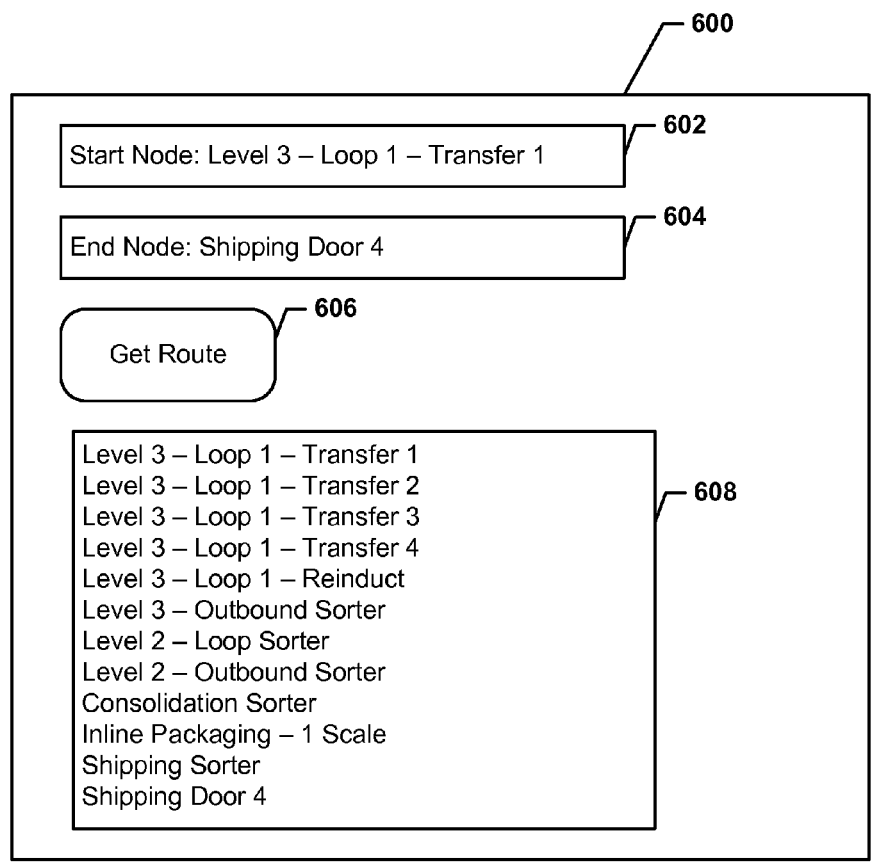
FIG. 9 is another block diagram of an example route generation graphical user interface element according to an embodiment.

FIG. 9 illustrates the example route generation graphical user interface element 600 showing the route determined based on the graph illustrated in FIG. 8 according to the operations of method 400 described above. The start node field 602 and end node field 604 information may be the same as illustrated in FIG. 6, but in response to the selection of the button 606 the ordered listing in route field 608 may be different in FIG. 9 because an alternative route was found around the disabled edge BB.

Figure 10:
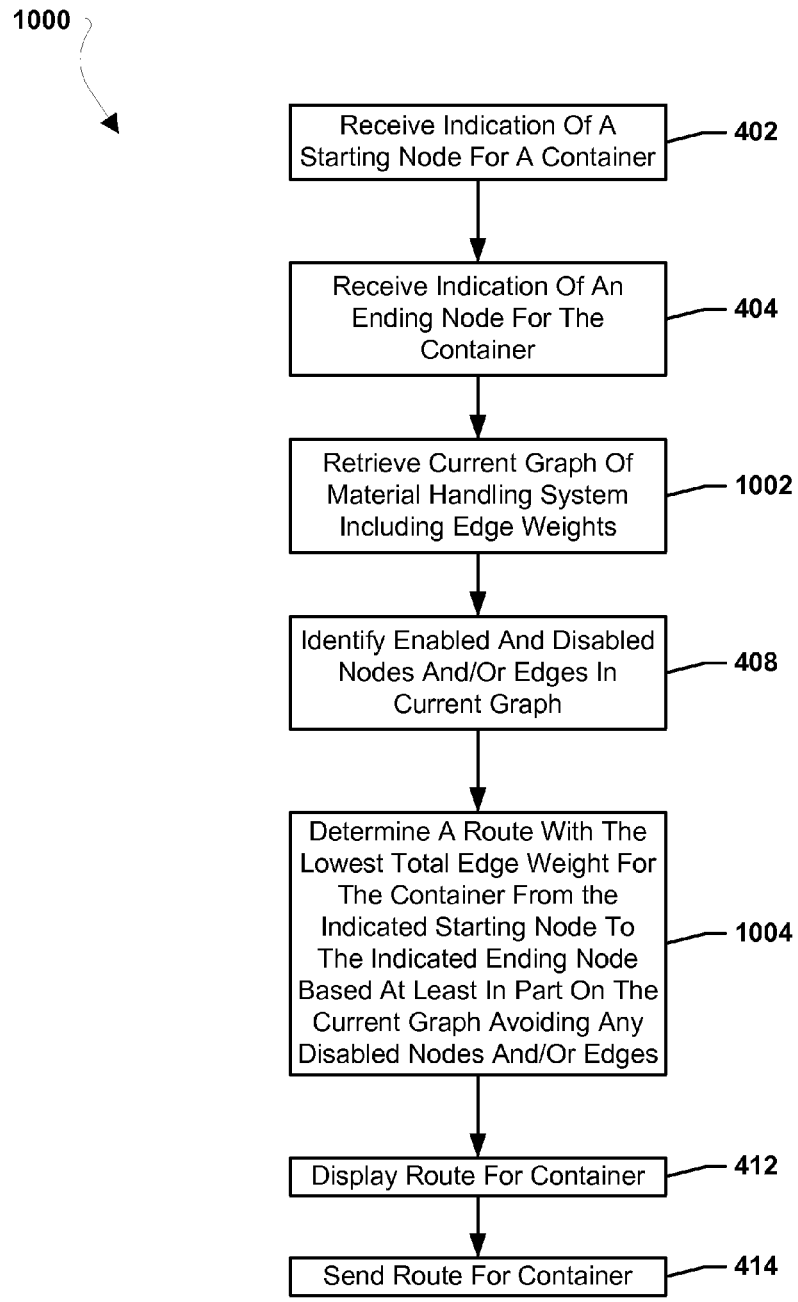
FIG. 10 is a process flow diagram illustrating an embodiment method for determining a route based on a current graph of a material handling system including edge weights.

FIG. 10 illustrates an embodiment method 1000 for determining a route based on a current graph of a material handling system including edge weights. The operations of method 1000 may be similar to the operations of method 400 described above with reference to FIG. 4, except that in method 1000 the graph may include edge weights which may be used to determine the optimal path. In an embodiment, the operations of method 1000 may be performed by a processor of a computing device, such as computing device running a container routing application or module. In blocks 402 and 404 the computing device may perform operations of like numbered blocks of method 400 described above with reference to FIG. 4. In block 1002 the computing device may retrieve a current graph of the material handling system including edge weights. Edge weights may be weights or cost associated with each conveyor or other piece of material handling equipment connecting two nodes in the material handling system. In an embodiment, edge weights may be determined by the computing device and assigned to each edge in the graph based on a utilization percentage or loading of each conveyor or other piece of material handling equipment. Additionally, edge weights may be based on other factors, such as conveyor speed, container count, container congestion, etc. The edge weights may change as the utilization (or loading) or other factors of each conveyor or other piece of material handling equipment changes.

As discussed above, in block 408 the computing device may identify enabled and disabled nodes and/or edges in the current graph. In block 1004 the computing device may determine a route with the lowest total edge weight for the container from the indicated starting node to the indicated ending node based at least in part on the current graph and avoiding any disabled nodes and/or edges. In an embodiment, the computing device may apply shortest path or minimum spanning tree algorithms to evaluate the current graph based on the current edge weights and determine a route avoiding disabled nodes and/or edges. In this manner, the computing device may find an optimal route (e.g., a route with a lowest total edge weight or lowest cost) for the container from the starting node to the ending node that routes the container around disabled paths. In this way, a container may be routed through an optimal route that avoids traffic (i.e., congested pieces of material handling equipment). As discussed above, in block 412 the computing device may display the route for the container and in block 414 the computing device may send the route for the container 414. As an example, an indication of the optimal route may be sent to a conveyor control system or module to control pieces of material handling system in the distribution center to move the container from the starting node to the ending node along the optimal route.

Figure 11:
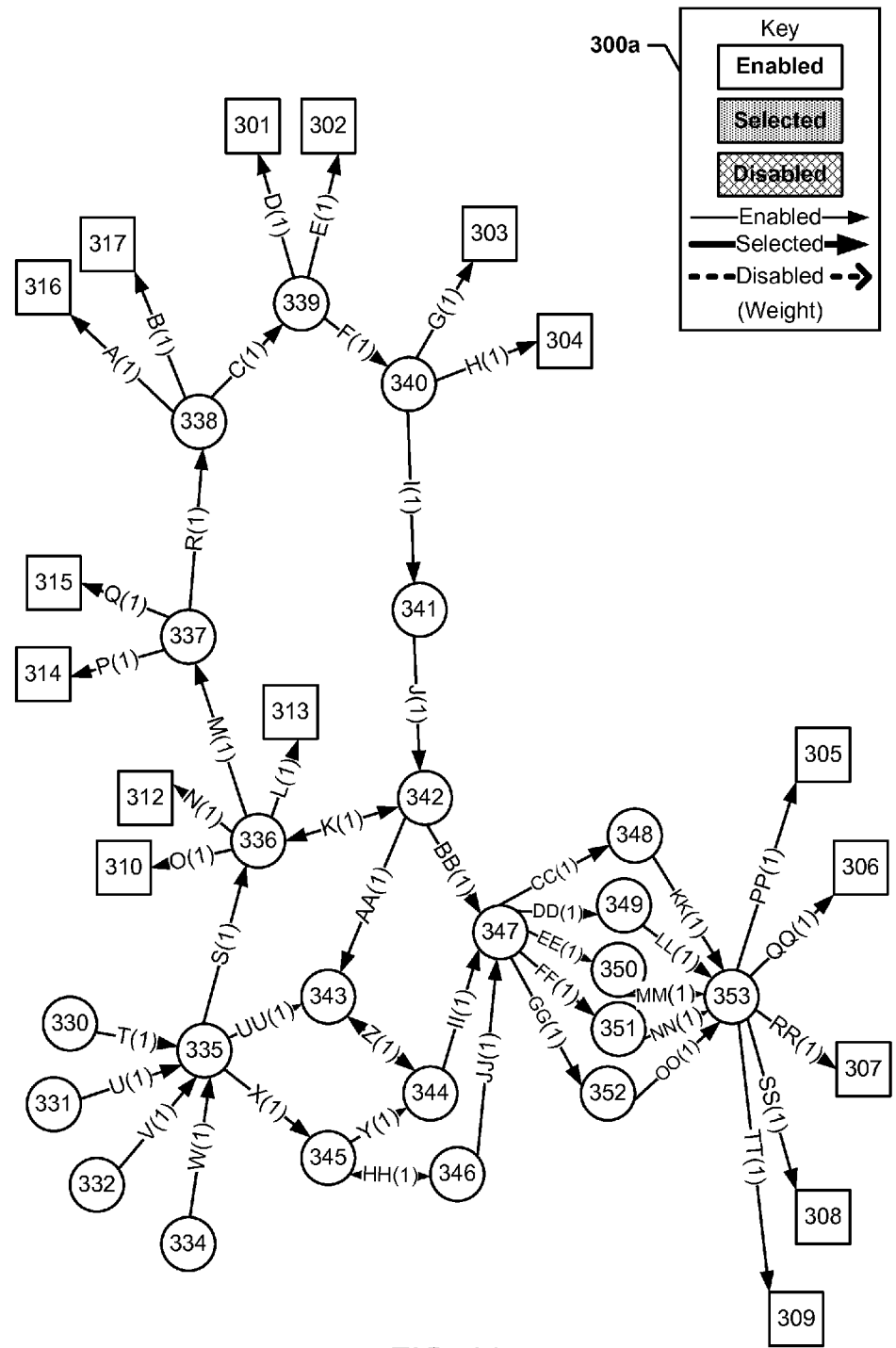
FIG. 11 is a graph of a material handling system including edge weights in a first state according to an embodiment.

FIG. 11 is a graph of a material handling system including edge weights in a first state according to an embodiment. The graph shown in FIG. 11 is the same as the graph shown in FIG. 3, except edge weights have been added to each edge and edge H and node 304 are enabled. In the graph shown in FIG. 11 the edge weight for each edge in the distribution center is equal at a value of 1. Additionally, the key 300*a* may indicate that edge weights appear between the parentheses on each edge.

Figure 12:
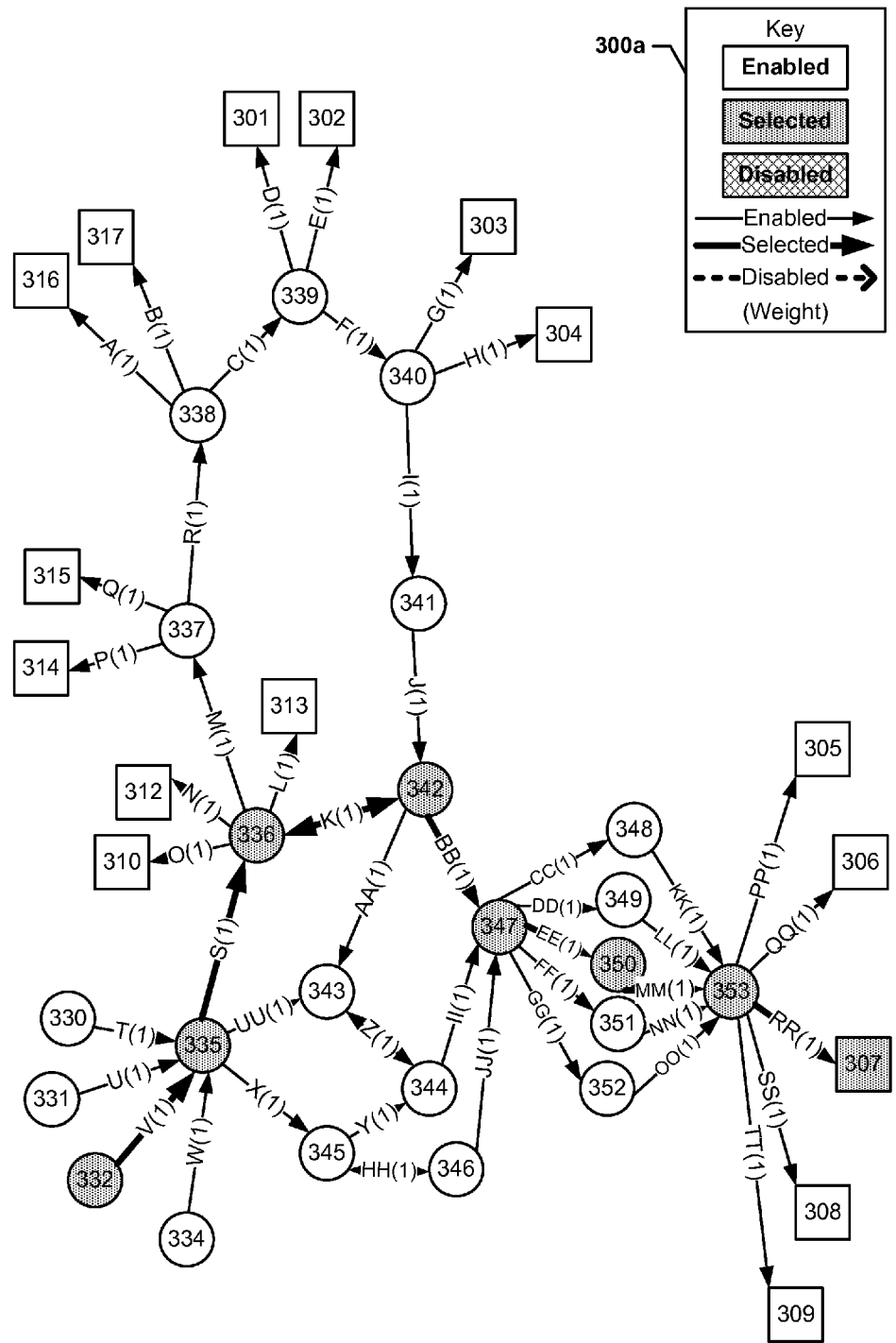
FIG. 12 is a graph of the material handling system including edge weights in the first state illustrating a container route according to an embodiment.

FIG. 12 is a graph of the material handling system in the first state illustrated in FIG. 11 showing a container route determined according to the operations of method 1000 described above. The starting node may have been indicated as the automatic carton build station 332 and the ending node as the shipping door 307. Based on the edge weights the computing device may have determined a route for the container from the automatic carton build station 332 to the order start sorter 335 via the edge V, from the order start sorter 335 to the loop sorter 336 via the edge S, from the loop sorter 336 to the outbound sorter 342 via the edge K, from the outbound sorter 342 to the consolidation sorter 347 via the edge BB, from the consolidation sorter 347 to the inline scale 350 via the edge EE, from the inline scale 350 to the shipping sorter 353 via the edge MM, and from the shipping sorter 353 to the shipping door 307 via the edge RR. As the edge weights are all 1.0, the total edge weight or total cost for the route may be 7.0.

Figure 13:
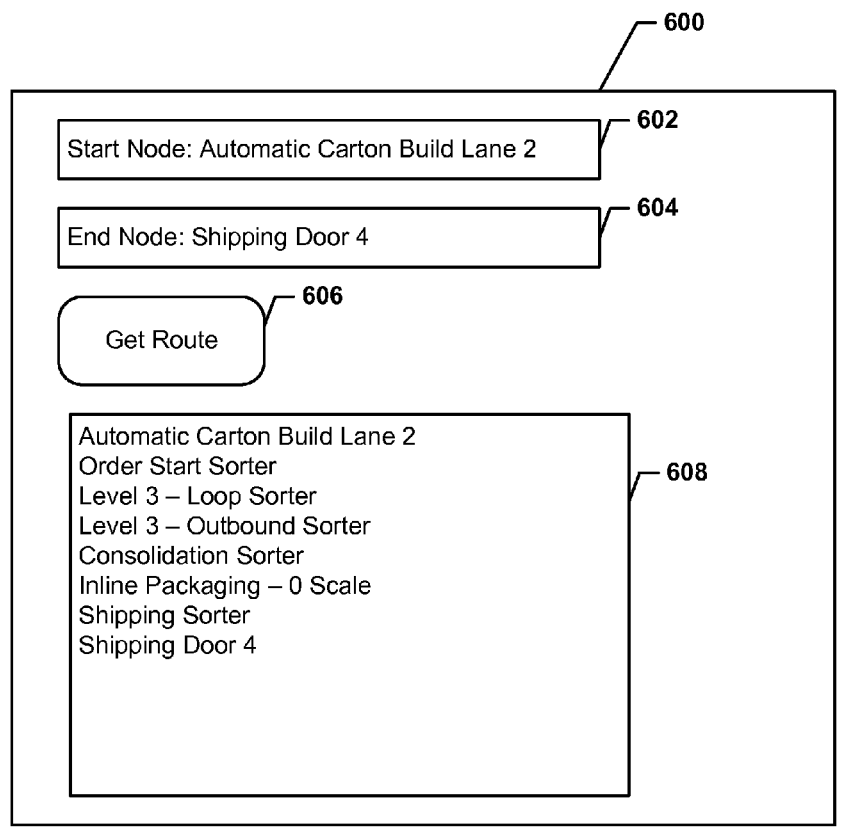
FIG. 13 is a third block diagram of an example route generation graphical user interface element according to an embodiment.

FIG. 13 illustrates the example route generation graphical user interface element 600 showing the route determined based on the graph illustrated in FIG. 12 according to the operations of method 1000 described above. The identifier for the starting node automatic carton build station 332 "Automatic Carton Build Lane 2" may be entered in a start node field 602 and the identifier for an ending node shipping door 307 "Shipping Door 4" may be entered in an end node field 604. In response to the selection of the button 606, the ordered listing of the identifiers of the various nodes through which the container will travel along the determined route from the starting node to the ending node may be displayed in the route field 608.

Figure 14:
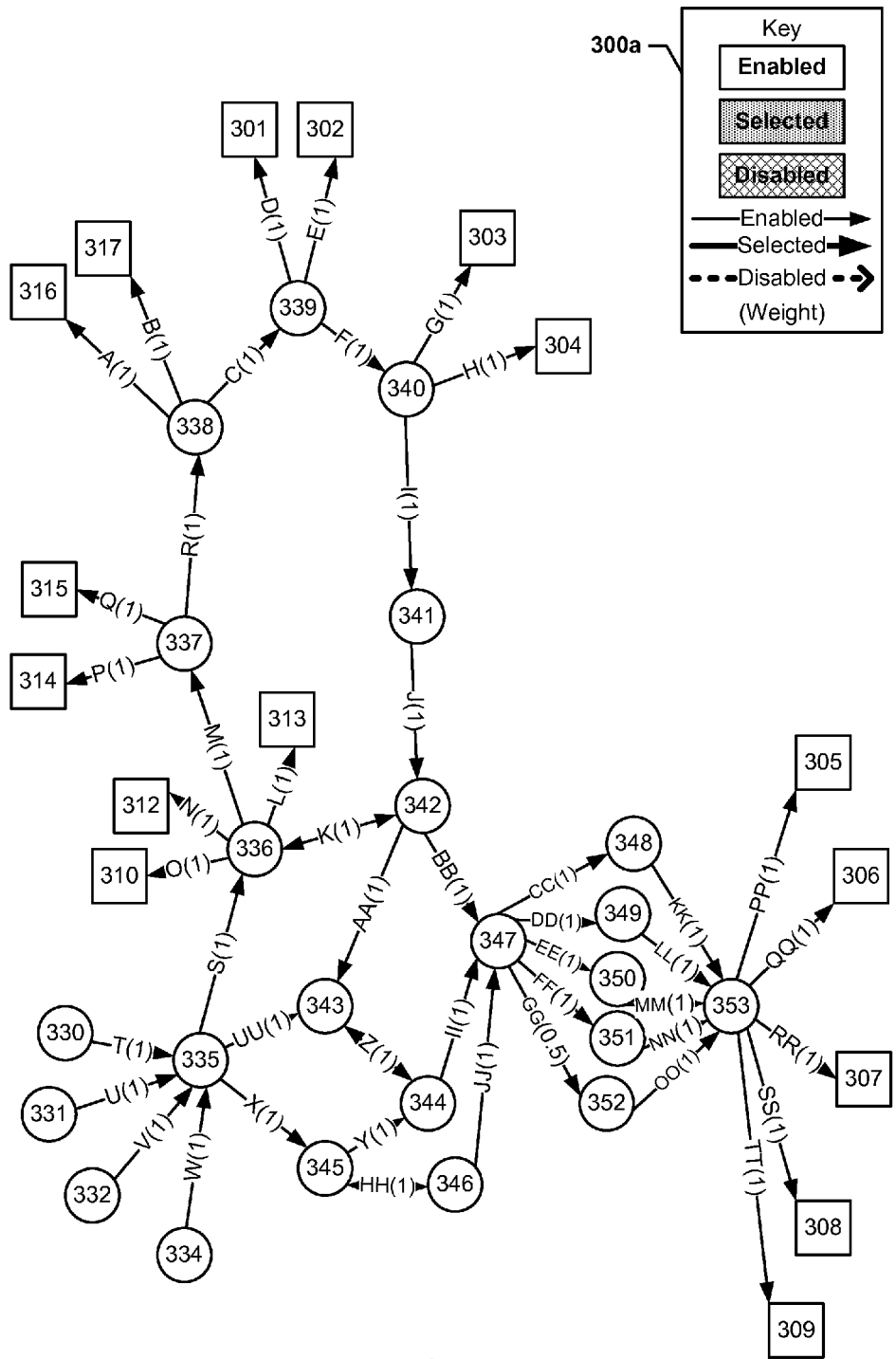
FIG. 14 is a graph of the material handling system including edge weights in a second state according to an embodiment.

FIG. 14 is a graph of the material handling system illustrated in FIG. 11 in a second state, such as at a later time, in which the edge weight of edge GG between the consolidation sorter 347 and the gift wrap scale 352 has been reduced to 0.5. The edge weight of edge GG may have been reduced because an equipment event received by the computing device may have indicated the conveyor between the consolidation sorter 347 and the gift wrap scale 352 may be loaded below its working capacity.

Figure 15:
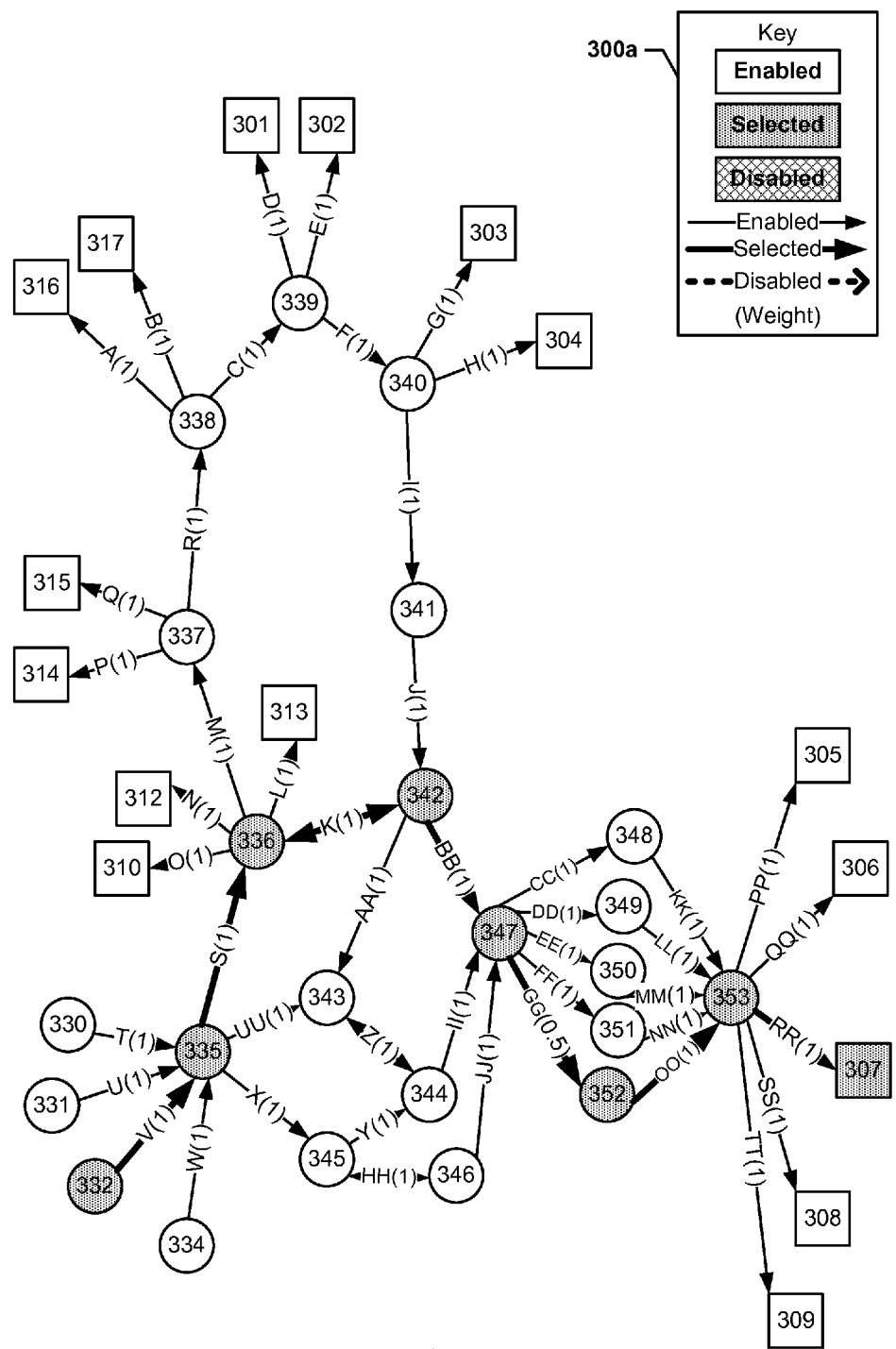
FIG. 15 is a graph of the material handling system including edge weights in the second state illustrating a container route according to an embodiment.

FIG. 15 is a graph of the material handling system in the second state illustrated in FIG. 14 showing a container route determined according to the operations of method 1000 described above. The starting node may have been indicated as the automatic carton build station 332 and the ending node as the shipping door 307, the same as discussed above with reference to FIG. 12, but because the edge GG has a lower edge weight the determined route from the automatic carton build station 332 to the shipping door 307 may be different in FIG. 15. Because the edge GG has a lower edge weight of 0.5 than the edge EE with a current edge weight of 1.0, an alternative route may be determined including the edge GG rather than the edge EE, such that the total edge weight for the alternative route (i.e., 6.5) is lower than the total edge weight of the route discussed above with reference to FIG. 12 (i.e., 7.0). Based on the edge weights the computing device may have determined an alternative route for the container from the automatic carton build station 332 to the order start sorter 335 via the edge V, from the order start sorter 335 to the loop sorter 336 via the edge S, from the loop sorter 336 to the outbound sorter 342 via the edge K, from the outbound sorter 342 to the consolidation sorter 347 via the edge BB, from the consolidation sorter 347 to the gift wrap scale 352 via the edge GG, from the gift wrap scale 352 to the shipping sorter 353 via the edge OO, and from the shipping sorter 353 to the shipping door 307 via the edge RR.

Figure 16:
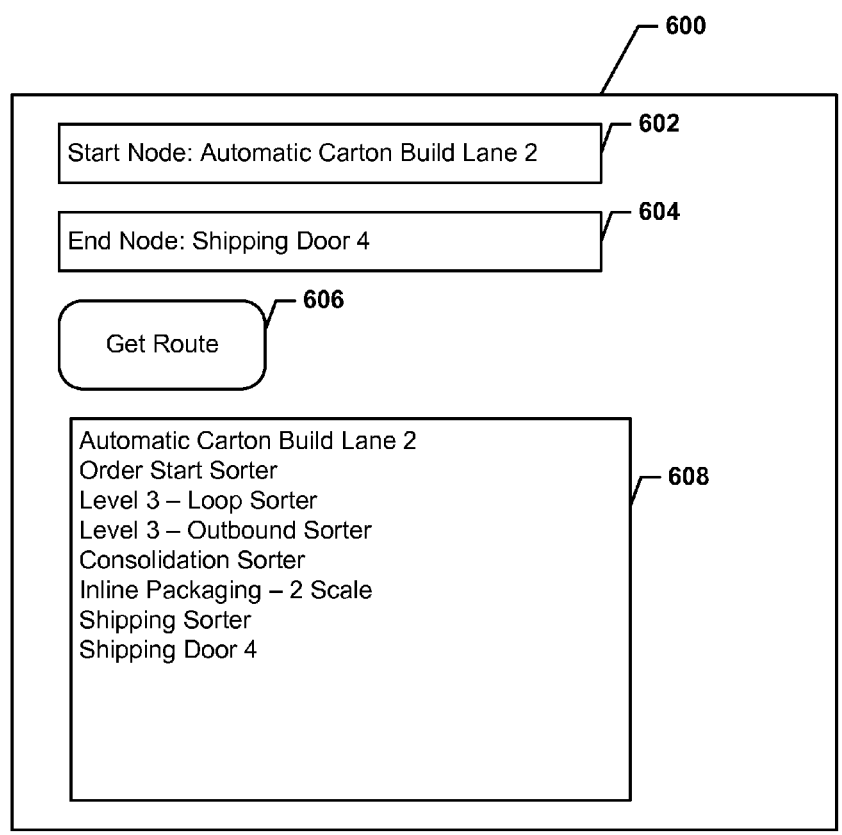
FIG. 16 is a fourth block diagram of an example route generation graphical user interface element according to an embodiment.

FIG. 16 illustrates the example route generation graphical user interface element 600 showing the route determined based on the graph illustrated in FIG. 14 according to the operations of method 1000 described above. The start node field 602 and end node field 604 information may be the same as illustrated in FIG. 13, but in response to the selection of the button 606 the ordered listing in route field 608 may be different in FIG. 16 because an alternative route was found using the edge GG with the lower edge weight.

Figure 17:
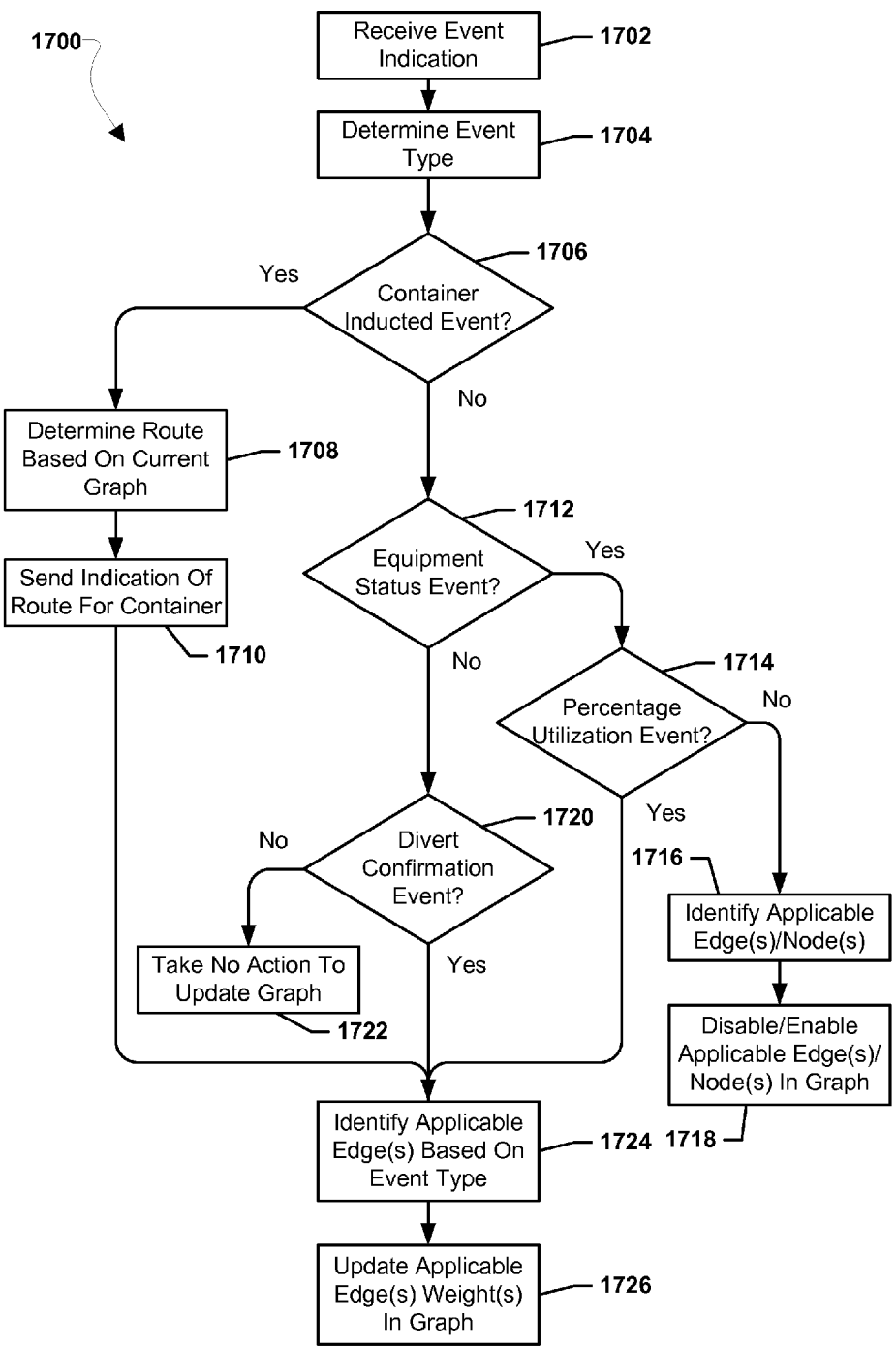
FIG. 17 is a process flow diagram illustrating an embodiment method for handling events to update a graph of a material handling system.

FIG. 17 is a flow chart illustrating an embodiment method for handling events to update a graph of a material handling system. In an embodiment, the operations of method 1700 may be performed by a processor of a computing device, such as computing device running a container routing application. In an embodiment, the operations of method 1700 may be performed in conjunction with the operations of methods 400 and 1000 described above.

In block 1702 the computing device may receive an indication of an event. Indications of events may be messages received from a machine control module of a conveyor control system or module. Indications of events may include indications of equipment status events, such as enable/disable events or utilization percentage events, container induct events, divert confirmation events, and/or other type of events. An indication of an enable/disable event may identify one or more nodes and/or edges that are to be enabled (e.g., because the nodes and/or edges have been repaired) or disabled (e.g., because the nodes and/or edges have broken down). An indication of a percentage full event may identify a loading percentage of one or more edges, such as the percentage over or under capacity of one or more conveyors. An indication of a container induction event may identify a container being admitted/received into the material handling system and a starting node and ending node for the container. Induct events may be received in response to containers entering various points within the material handling system, such as being inducted into sorters, pick and pass areas, transfers, etc. An indication of a divert confirmation event may identify that containers are being diverted from one piece of material handling equipment to another piece of material handling equipment.

In block 1704 the computing device may determine the event type. An event type may be determined by a message header and/or indications of the event type included within other data of the event. In determination block 1706 the computing device may determine whether the event indication is an indication of a container inducted event. If the event indication is an indication of a container inducted event (i.e., determination block 1706="Yes"), in block 1708 the computing device may determine a route for the container based on the current graph. In an embodiment, the computing device may determine a route according to the operations of method 1000 described above with reference to FIG. 10. In block 1710 the computing device may send an indication of the route for the container to the machine control module of the conveyor control system or module. In an embodiment, the indication of the route for the container may include the starting node, intermediate nodes, intermediate edges, and/or ending node comprising the determined route for the container. In another embodiment, the indication of the route for the container may merely indicate the next divert or node at which a container's direction may change. As conditions in the material handling system, such as edge enable/disable states, may change as the container moves through the material handling system sending less than the entire route plan for the container may enable the route to be dynamically changed as events occur in the material handling system. For example, every node in the material handling system may include a sensor that may identify a container has arrived at the node (e.g., by scanning a barcode of the container), and when the container is identified at a node a new container inducted event may be indicated resulting in a new indication of a new route for the container (e.g., an indication of the next divert or node at which a container's direction may change) to be sent to the machine control module of the conveyor control system or module. In this manner, should an event occur changing a state of the material handling system (e.g., an edge is disabled) while the container is transiting from its intended starting node to its intended ending node, the intermediate edges and/or nodes may be changed accordingly to dynamically respond to the changing state of the material handling system.

If the event indication is not an indication of a container inducted event (i.e., determination block 1706="No"), in determination block 1712 the computing device may determine whether the event indication is an indication of an equipment status event. If the event indication is an indication of an equipment status event (i.e., determination block 1712="Yes"), in determination block 1714 the computing device may determine whether the equipment status event is a percentage utilization event. In an embodiment, equipment status events may be percentage utilization events or enable/disable events. If the equipment status event is an enable/disable event (i.e., determination block 1714="No"), in block 1716 the computing device may identify the applicable edge(s) and/or node(s). In an embodiment, edges and nodes to be disabled or enabled may be indicated in the indication of the enable/disable event, such as in a message body. In block 1718 the computing device may disable and/or enable the identified edge(s) and node(s) in the current graph of the material handling system.

If the event indication is not an indication of an equipment status event (i.e., determination block 1712="No"), in determination block 1720 the computing device may determine whether the event indication is an indication of a divert confirmation event. If the event indication is not an indication of a divert confirmation event (i.e., determination block 1720="No"), in block 1722 the computing device may take no action to update the graph of the material handling system. For example, the event indication may be some other type of event that may not impact the graph and/or require the graph of the material handling system to be updated.

If the event indication is an indication of a divert confirmation event (i.e., determination block 1720="Yes"), if the equipment status event is a percentage utilization event (i.e., determination block 1714="Yes"), or upon sending an indication of the route for the container in block 1710, in block 1724 the computing device may identify applicable edge(s) based on the event type. As an example, an applicable edge or edge(s) may be the edge or edges of a route indicated for a container in block 1710. As another example, an applicable edge or edge(s) may be the edge or edges identified as having a certain percentage utilization in a message body of an indication of a percentage utilization event in block 1714. As a further example, an applicable edge or edge(s) may be the edge or edges to or from which containers are being diverted according to a message body of an indication of a divert confirmation event in block 1720. In block 1726 the computing device may update the applicable edge or edges respective weights in the current graph of the material handling system. Updating the applicable edge weights may include adding to, subtracting from, and/or replacing edge weight values associated with one or more edges. In this manner, the edge weights of the graph of the material handling system may be dynamically updated as indication of events are received. The operations of method 1700 may be performed repeatedly by the computing device to route containers and update the current graph of the material handling system resulting in container routes that dynamically respond to changing conditions of the material handling system.

Figure 18:
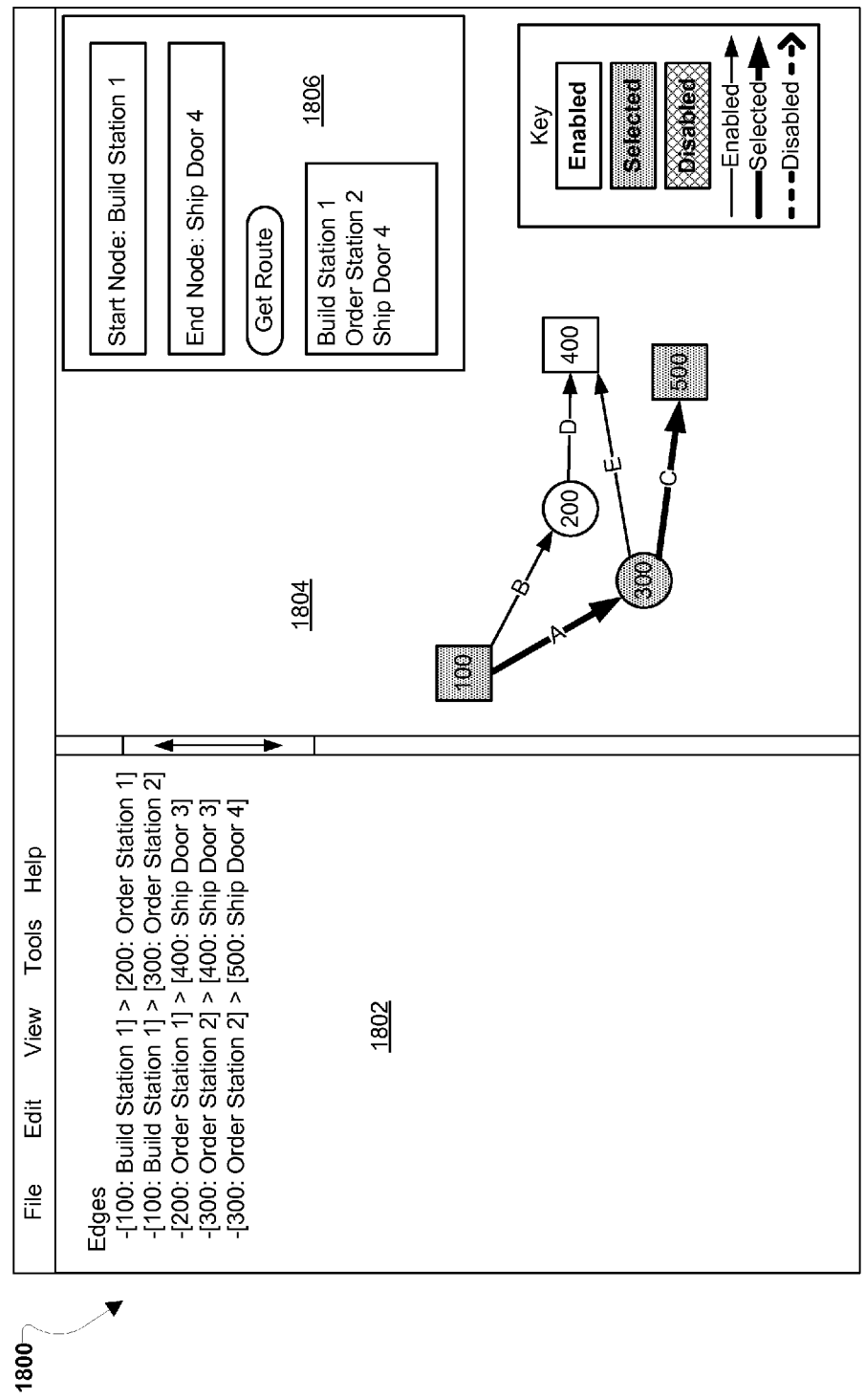
FIG. 18 illustrates an example screen shot a graph based container routing application according to an embodiment.

FIG. 18 illustrates an example screen shot of a graph based container routing application according to an embodiment. The graphical user interface 1800 of the graph based container routing application may include a listing 1802 of the connections between the various edges and nodes of the material handling system. The graphical user interface 1800 may include a graph 1804 visually illustrating the edges, nodes, and selected routes in the material handling system. Additionally, the graphical user interface 1800 may include a route generation element 1806 enabling a user to enter an indication of a starting node and ending node and generate a route between the two based on the current graph 1804 of the material handling system.

Figure 19:
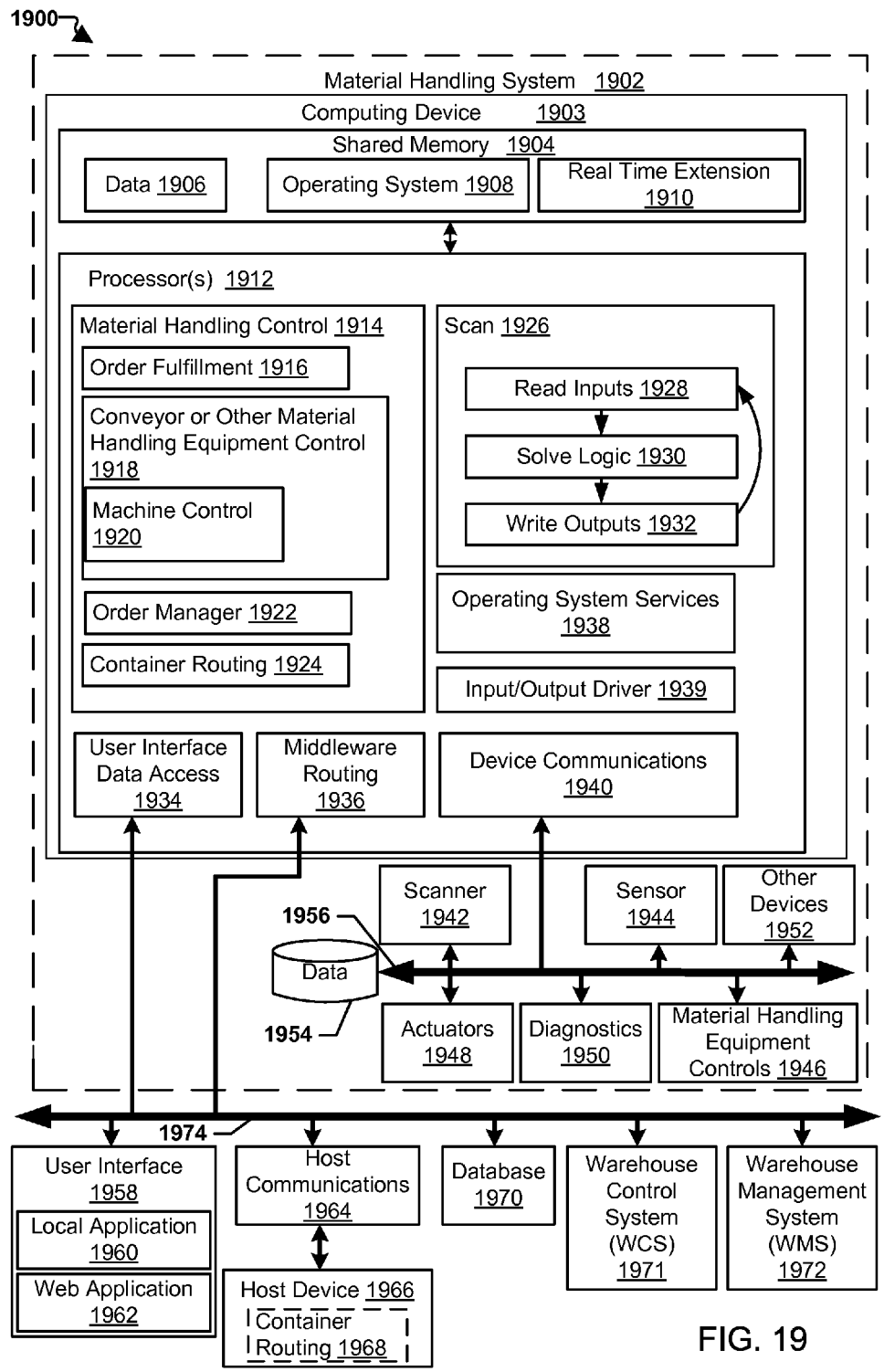
FIG. 19 illustrates an exemplary processing architecture of a material handling system suitable for use with the various embodiments.

FIG. 19 illustrates an exemplary processing architecture 1900 of a material handling system 1902 suitable for use with the various embodiments. The processing architecture 1900 may be implemented in hardware, software, or combinations of hardware and software in one computing device or across a series of computing devices in communication with each other as needed to perform the functionality described herein.

The material handling system 1902 may include a computing device 1903 including a processor readable shared memory 1904 connected to one or more processors 1912. The one or more processors may function as controllers for the material handling system 1902. For example, one processor may be a primary controller while another may serve as a backup controller that may be swapped for the primary controller automatically or by maintenance personnel in the event of a failure without undue service downtime. The shared memory 1904 may include an operating system (e.g., Windows, Linux, etc.) and real time extension 1910.

The one or more processors 1912 may execute various logical layers, applications, or modules including a material handling controls 1914, scans 1926, user interface data access 1934, middleware routing 1936, device communications 1940, operating system services 1938, and input/output drivers 1939. The various logical layers, applications, or modules including material handling controls 1914, scans 1926, user interface data access 1934, middleware routing 1936, device communications 1940, operating system services 1938, and/or input/output drivers 1939 may be executed in conjunction with one another and exchange data with one another. As the one or more processors receive inputs (e.g., signals from switches, photo eyes, etc., data messages, or other various input types) the various logical layers, applications, or modules including material handling controls 1914, scans 1926, user interface data access 1934, middleware routing 1936, device communications 1940, operating system services 1938, and/or input/output drivers 1939 may be executed individually and/or in concert by the one or more processors 1912 to generate outputs (e.g., electrical signals to motor contacts, solenoid valves, switches, lamps, etc., data messages, or other output types).

Scans 1926 may be repeatedly executed by the one or more processors 1912 and may include a read inputs module 1928, a solve logic module 1930, and a write outputs module 1932. By executing the various logical operations of the modules 1928, 1930, and 1932 on a regular period basis the scans 1926 may be counted to measure time. The solve logic module 1930 may incorporate any type of logic, including "if-then-else" branching logic, motion control logic, simple logic, sophisticated logic, hard lined logic, configured logic, etc. Data used by the solve logic module 1930 may reside in the shared memory 1904, such as data 1906, or a local, remote, or cloud-based data storage device, such as data store 1954. Scans 1926 may be performed at different intervals, for example scans for motion control may occur every 1 millisecond to 2 milliseconds, scans for merge subsystems may occur every 5 milliseconds, and general conveyor scans may occur every 25 milliseconds.

Material handling controls 1914 may include order fulfillment module 1916, conveyor or other material handling equipment control module 1918 including a machine control module 1920 to generate instructions for conveyors and/or other material handling equipment, order manager module 1922, and container routing application or module 1924 to generate routes for containers from one place to another in a distribution center.

The one or more processor 1912 may exchange data with scanners 1942, sensors 1944, actuators 1948, diagnostic systems 1950, material handling equipment controls 1946 (such as conveyor controls), data store 1954, and other devices 1952 (e.g., scales, printers, etc.) via network connections 1956 (e.g., TCP/IP connections, Ethernet connections, Ethercat connections, PROFIBUS connections, RS 232 connections, USB connections, Wi-Fi connections, cellular connections, etc.).

The processing architecture 1900 may include other systems interfacing with the material handling system 1902 via network connections 1974 (e.g., TCP/IP connections, Ethernet connections, Ethercat connections, PROFIBUS connections, RS 232 connections, USB connections, Wi-Fi connections, cellular connections, etc.), such as user interface devices 1958 (e.g., a display, user terminal, etc.) displaying a local application 1960 or web application 1962, host communication devices 1964 enabling communication with a host device 1966 (e.g., via FTP, TCP/IP, etc.), a database 1970, a warehouse control system (WCS) 1971, and/or a warehouse management system (WMS) 1972. A host device may also include a container routing module or application 1968 which may send routing information for containers to the one or more processors 1912 of the material handling system 1902.

Figure 20:
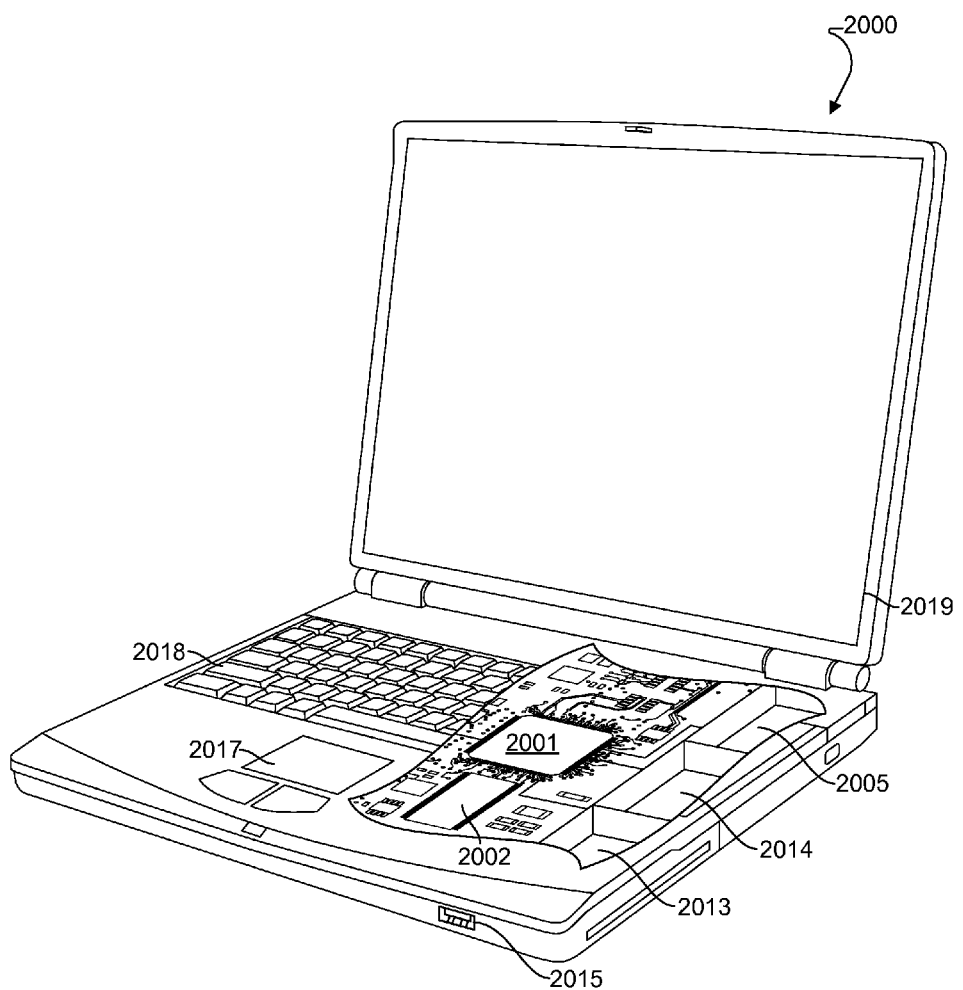
FIG. 20 is a component block diagram of a computing device suitable for use with the various embodiments.

The various embodiments may be implemented in any of a variety of computing devices, an example of which is illustrated in FIG. 20. A computing device 2000 will typically include a processor 2001 coupled to volatile memory 2002 and a large capacity nonvolatile memory, such as a disk drive 2005 or Flash memory. The computing device 2000 may also include a floppy disc drive 2013 and a compact disc (CD) drive 2014 coupled to the processor 2001. The computing device 2000 may also include a number of connector ports 2015 coupled to the processor 2001 for establishing data connections or receiving external memory devices, such as a USB or FireWire® connector sockets, or other network connection circuits for establishing network interface connections from the processor 2001 to a network or bus, such as a local area network coupled to other computers and servers, the Internet, the public switched telephone network, and/or a cellular data network. The computing device 2000 may also include the trackball or touch pad 2017, keyboard 2018, and display 2019 all coupled to the processor 2001.

Figure 21:
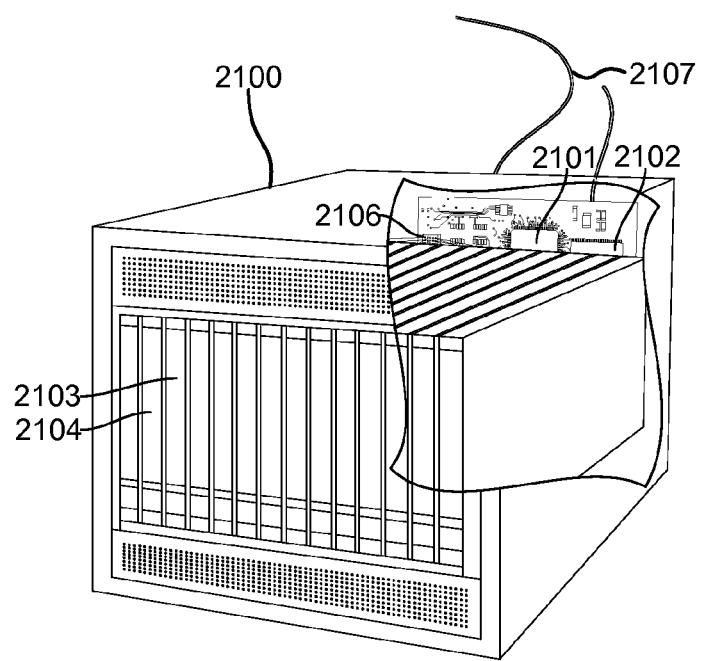
FIG. 21 is a component diagram of an example server suitable for use with the various embodiments.

The various embodiments may also be implemented on any of a variety of commercially available server devices, such as the server 2100 illustrated in FIG. 21. Such a server 2100 typically includes a processor 2101 coupled to volatile memory 2102 and a large capacity nonvolatile memory, such as a disk drive 2103. The server 2100 may also include a floppy disc drive, compact disc (CD) or DVD disc drive 2104 coupled to the processor 2101. The server 2100 may also include network access ports 2106 coupled to the processor 2101 for establishing network interface connections with a network 2107, such as a local area network coupled to other computers and servers, the Internet, the public switched telephone network, and/or a cellular data network.

The processors 2001 and 2101 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 2002, 2005, 2102, and 2103 before they are accessed and loaded into the processors 2001 and 2101. The processors 2001 and 2101 may include internal memory sufficient to store the application software instructions. In many devices the internal memory may be a volatile or nonvolatile memory, such as flash memory, or a mixture of both. For the purposes of this description, a general reference to memory refers to memory accessible by the processors 2001 and 2101 including internal memory or removable memory plugged into the device and memory within the processor 2001 and 2101 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of optimizing container routes in a material handling system, comprising:
    receiving, at a computing device, an indication of a starting node of a container in the material handling system;
    receiving, at the computing device, an indication of an ending node of the container in the material handling system;
    retrieving, at the computing device, a current graph of a material handling system;
    identifying, at the computing device, any disabled nodes and edges in the current graph;
    determining, at the computing device, the container route through the material handling system from the starting node to the ending node based at least in part on the current graph avoiding any identified disabled nodes and edges; and
    sending the determined container route to a material handling system control module.

2. The method of claim 1, further comprising displaying the determined route on a display of the computing device.

3. The method of claim 1, wherein the material handling system includes a conveyor or a sorter.

4. The method of claim 1, wherein:
    the current graph of the material handling system is a directional graph including edge weights; and
    determining, at the computing device, the container route through the material handling system from the starting node to the ending node based at least in part on the current graph avoiding any identified disabled nodes and edges comprises determining, at the computing device, a route with a lowest total edge weight for the container route through the material handling system from the starting node to the ending node based at least in part on the current graph avoiding any identified disabled nodes and edges.

5. The method of claim 4, further comprising:
    receiving an indication of an equipment status event; and
    updating the current graph in response to receiving the indication of the equipment status event.

6. The method of claim 5, wherein:
    the indication of the equipment status event is an indication of an enable or disable event for a node or edge; and
    updating the current graph in response to receiving the indication of the equipment status event comprises updating the graph to change a status of a node or edge as enabled or disabled based on the indication of the enable or disable event.

7. The method of claim 5, wherein:
    the indication of the equipment status event is an indication of a percentage utilization event; and
    updating the current graph in response to receiving the indication of the equipment status event comprises changing an edge weight of the current graph based on the indication of the percentage utilization event.

8. The method of claim 5, further comprising:
    determining, at the computing device, another container route with a new lowest total edge weight for another container through the material handling system from the starting node to the ending node based at least in part on the updated current graph avoiding any identified disabled nodes and edges; and
    sending the determined another container route to the control module of the material handling system.

9. The method of claim 4, further comprising:
    receiving an indication of a divert confirmation event; and
    changing an edge weight of the current graph based on the indication of the divert confirmation event.

10. The method of claim 4, wherein the route with a lowest total edge weight for the container through the distribution center from the starting node to the ending node is determined at least in part using a minimum spanning tree algorithm.

11. A computing device, comprising:
    a memory; and
    a processor coupled to the memory, wherein the processor is configured with processor-executable instructions to perform operations comprising:
        receiving, an indication of a starting node of a container in a material handling system;
        receiving an indication of an ending node of the container in the material handling system;
        retrieving, a current graph of a material handling system;
        identifying, at the computing device, any disabled nodes and edges in the current graph;
        determining the container route through the material handling system from the starting node to the ending node based at least in part on the current graph avoiding any identified disabled nodes and edges; and
        sending the determined container route to a material handling system control module.

12. The computing device of claim 11, further comprising a display connected to the processor, wherein the processor is configured with processor-executable instructions to perform operations further comprising displaying the determined route on the display.

13. The computing device of claim 11, wherein the material handling system includes a conveyor or a sorter.

14. The computing device of claim 11, wherein the processor is configured with processor-executable instructions to perform operations such that:
the current graph of the material handling system is a directional graph including edge weights; and
determining the container route through the material handling system from the starting node to the ending node based at least in part on the current graph avoiding any identified disabled nodes and edges comprises determining a route with a lowest total edge weight for the container route through the material handling system from the starting node to the ending node based at least in part on the current graph avoiding any identified disabled nodes and edges.

15. The computing device of claim 14, wherein the processor is configured with processor-executable instructions to perform operations further comprising:
receiving an indication of an equipment status event; and
updating the current graph in response to receiving the indication of the equipment status event.

16. The computing device of claim 15, wherein the processor is configured with processor-executable instructions to perform operations such that:
the indication of the equipment status event is an indication of an enable or disable event for a node or edge; and
updating the current graph in response to receiving the indication of the equipment status event comprises updating the graph to change a status of a node or edge as enabled or disabled based on the indication of the enable or disable event.

17. The computing device of claim 15, wherein the processor is configured with processor-executable instructions to perform operations such that:
the indication of the equipment status event is an indication of a percentage utilization event; and
updating the current graph in response to receiving the indication of the equipment status event comprises changing an edge weight of the current graph based on the indication of the percentage utilization event.

18. The computing device of claim 15, wherein the processor is configured with processor-executable instructions to perform operations further comprising:
determining, at the computing device, another container route with a new lowest total edge weight for another container through the material handling system from the starting node to the ending node based at least in part on the updated current graph avoiding any identified disabled nodes and edges; and
sending the determined another container route to the control module of the material handling system.

19. The computing device of claim 14, wherein the processor is configured with processor-executable instructions to perform operations further comprising:
receiving an indication of a divert confirmation event; and
changing an edge weight of the current graph based on the indication of the divert confirmation event.

20. The computing device of claim 14, wherein the processor is configured with processor-executable instructions to perform operations such that the route with a lowest total edge weight for the container through the distribution center from the starting node to the ending node is determined at least in part using a minimum spanning tree algorithm.

21. A non-transitory processor readable storage medium having stored thereon processor-executable instructions configured to cause a processor to perform operations comprising:
receiving, an indication of a starting node of a container in a material handling system;
receiving an indication of an ending node of the container in the material handling system;
retrieving, a current graph of a material handling system;
identifying, at the computing device, any disabled nodes and edges in the current graph;
determining the container route through the material handling system from the starting node to the ending node based at least in part on the current graph avoiding any identified disabled nodes and edges; and
sending the determined container route to a material handling system control module.

22. The non-transitory processor readable storage medium of claim 21, wherein the stored processor-executable instructions are configured to cause a processor to perform operations further comprising displaying the determined route.

23. The non-transitory processor readable storage medium of claim 21, wherein the stored processor-executable instructions are configured to cause a processor to perform operations such that the material handling system includes a conveyor or a sorter.

24. The non-transitory processor readable storage medium of claim 21, wherein the stored processor-executable instructions are configured to cause a processor to perform operations such that:
the current graph of the material handling system is a directional graph including edge weights; and
determining the container route through the material handling system from the starting node to the ending node based at least in part on the current graph avoiding any identified disabled nodes and edges comprises determining a route with a lowest total edge weight for the container route through the material handling system from the starting node to the ending node based at least in part on the current graph avoiding any identified disabled nodes and edges.

25. The non-transitory processor readable storage medium of claim 24, wherein the stored processor-executable instructions are configured to cause a processor to perform operations further comprising:
receiving an indication of an equipment status event; and
updating the current graph in response to receiving the indication of the equipment status event.

26. The non-transitory processor readable storage medium of claim 25, wherein the stored processor-executable instructions are configured to cause a processor to perform operations such that:
the indication of the equipment status event is an indication of an enable or disable event for a node or edge; and
updating the current graph in response to receiving the indication of the equipment status event comprises updating the graph to change a status of a node or edge as enabled or disabled based on the indication of the enable or disable event.

27. The non-transitory processor readable storage medium of claim 25, wherein the stored processor-executable instructions are configured to cause a processor to perform operations such that:
the indication of the equipment status event is an indication of a percentage utilization event; and
updating the current graph in response to receiving the indication of the equipment status event comprises changing an edge weight of the current graph based on the indication of the percentage utilization event.

28. The non-transitory processor readable storage medium of claim 25, wherein the stored processor-executable instructions are configured to cause a processor to perform operations further comprising:

determining, at the computing device, another container route with a new lowest total edge weight for another container through the material handling system from the starting node to the ending node based at least in part on the updated current graph avoiding any identified disabled nodes and edges; and sending the determined another container route to the control module of the material handling system.

29. The non-transitory processor readable storage medium of claim 24, wherein the stored processor-executable instructions are configured to cause a processor to perform operations further comprising:

receiving an indication of a divert confirmation event; and changing an edge weight of the current graph based on the indication of the divert confirmation event.

30. The non-transitory processor readable storage medium of claim 24, wherein the stored processor-executable instructions are configured to cause a processor to perform operations such that the route with a lowest total edge weight for the container through the distribution center from the starting node to the ending node is determined at least in part using a minimum spanning tree algorithm.

\* \* \* \* \*